US008521522B2

(12) United States Patent
Matsumura et al.

(10) Patent No.: US 8,521,522 B2
(45) Date of Patent: Aug. 27, 2013

(54) AUDIO CODING/DECODING METHOD AND APPARATUS USING EXCESS QUANTIZATION INFORMATION

(75) Inventors: Yuuki Matsumura, Saitama (JP); Shiro Suzuki, Kanagawa (JP); Keisuke Toyama, Kanagawa (JP); Mitsuyuki Hatanaka, Kanagawa (JP); Yuhki Mitsufuji, Tokyo (JP)

(73) Assignee: Sony Corporation, Tokyo (JP)

( * ) Notice: Subject to any disclaimer, the term of this patent is extended or adjusted under 35 U.S.C. 154(b) by 1936 days.

(21) Appl. No.: 11/381,791

(22) Filed: May 5, 2006

(65) Prior Publication Data

US 2006/0259298 A1 Nov. 16, 2006

(30) Foreign Application Priority Data

May 10, 2005 (JP) ................................ P2005-137667

(51) Int. Cl.
*H04B 14/06* (2006.01)

(52) U.S. Cl.
USPC ........... 704/229; 704/200; 704/203; 704/205; 704/222; 704/224; 704/230; 704/500; 704/501; 704/503; 341/200; 375/245

(58) Field of Classification Search
USPC ................. 704/230, 222, 224, 229, 500–504, 704/205, 203, 200; 341/200; 375/245
See application file for complete search history.

(56) References Cited

U.S. PATENT DOCUMENTS

| | | | | | |
|---|---|---|---|---|---|
| 5,774,844 | A * | 6/1998 | Akagiri | ......................... | 704/230 |
| 5,966,688 | A * | 10/1999 | Nandkumar et al. | ......... | 704/222 |
| 6,593,872 | B2 * | 7/2003 | Makino et al. | ................ | 341/200 |
| 6,871,106 | B1 * | 3/2005 | Ishikawa et al. | ................ | 700/94 |
| 6,904,404 | B1 * | 6/2005 | Norimatsu et al. | ........... | 704/222 |
| 7,212,973 | B2 * | 5/2007 | Toyama et | .................... | 704/500 |
| 7,283,967 | B2 * | 10/2007 | Nishio et al. | .................. | 704/500 |
| 7,406,412 | B2 * | 7/2008 | Vernon et al. | ................. | 704/229 |
| 8,090,577 | B2 * | 1/2012 | El-Maleh et al. | ............. | 704/230 |
| 2001/0047256 | A1 * | 11/2001 | Tsurushima et al. | ......... | 704/200 |
| 2002/0010577 | A1 * | 1/2002 | Matsumoto et al. | .......... | 704/219 |
| 2004/0002859 | A1 * | 1/2004 | Liu et al. | ....................... | 704/229 |
| 2004/0024593 | A1 * | 2/2004 | Tsuji et al. | .................... | 704/215 |
| 2005/0075872 | A1 * | 4/2005 | Kikuiri et al. | ................ | 704/230 |

* cited by examiner

*Primary Examiner* — Paras D Shah
(74) *Attorney, Agent, or Firm* — Dentons US LLP

(57) ABSTRACT

There is provided an audio coding device which appropriately sets the quantization bit number by a small calculation amount in each stage when coding an input audio signal by performing multi-stage normalization/quantization. A quantization information calculation section determines total quantization information idwl0, based on normalization information idsf, and allocates the total quantization information idwl0 for quantization information idwl1 and quantization information idwl2. At this time, the quantization information calculation section limits the quantization information idwl1 by a limiter lim1, and allocates the total quantization information idwl0 for quantization information idwl1. If the quantization information idwl1 exceeds the limiter lim1, the excess is allocated for the quantization information idwl2. A first normalization section and a first quantization section normalizes and quantizes a frequency spectrum mdspec1 in the first stage. A second normalization section and a second quantization section normalizes and quantizes a differential frequency spectrum mdspec2 in the second stage.

13 Claims, 18 Drawing Sheets

AUDIO CODING/DECODING METHOD AND APPARATUS USING EXCESS QUANTIZATION INFORMATION

CROSS REFERENCES TO RELATED APPLICATIONS

The present invention contains subject matter related to Japanese Patent Application JP 2005-137667 filed in the Japanese Patent Office on May 10, 2005, the entire contents of which being incorporated herein by reference.

BACKGROUND OF THE INVENTION

1. Field of the Invention

The present invention relates to an audio coding device and a method thereof by which an input audio signal is coded according to so-called transform coding and an obtained code string is transferred or recorded onto a recording medium, and also relates to an audio decoding device and a method thereof by which a code string transferred or red from a recording medium is decoded to obtain an output audio signal.

2. Description of the Related Art

There has been a known method in which spectrums obtained by performing time-frequency transform on an input audio signal are subjected to normalization/quantization and differential frequency spectrums as quantization errors are subjected again to normalization/quantization (see Patent Documents 1 and 2: Japanese Patent Publications No. 3227945 and No. 3227948). Quantization accuracy of the audio coding device can be improved by this method, and scalability can be realized to fit performance and use environment of the audio decoding device.

SUMMARY OF THE INVENTION

However, no method has been established yet at present to appropriately set the quantization bit number by a small calculation amount in each of multiple stages in case where multistage normalization/quantization is realized according to the known technology including the above patent publications.

The present invention has been proposed in view of the situation of known technology as described above. It is desirable to provide an audio coding device and a method thereof, which are capable of appropriately setting the quantization bit number in each stage by a small calculation amount when coding an input audio signal by performing multistage normalization/quantization, and an audio decoding device and a method thereof, which obtain an output audio signal by decoding a code string obtained by the audio coding device.

According to an embodiment of the present invention, there is provided an audio coding device including: a time-frequency transform means for performing time-frequency transform on an input audio signal to generate a frequency spectrum; quantization information calculation means for generating total quantization information indicating a quantization bit number on the basis of predetermined normalization information, and for allocating the total quantization information, to generate first quantization information and second quantization information each indicating a quantization bit number; a first normalization means for normalizing the frequency spectrum for every frequency component by use of a first normalization coefficient corresponding to the normalization information, to generate a normalized frequency spectrum; a first quantization means for linearly quantizing the normalized frequency spectrum by use of a first quantization coefficient corresponding to the first quantization information, to generate a quantized frequency spectrum; a subtraction means for subtracting, from the frequency spectrum, a frequency spectrum obtained by inversely quantizing and inversely normalizing the quantized frequency spectrum, to generate a differential frequency spectrum; a second normalization means for normalizing the differential frequency spectrum by use of a second normalization coefficient corresponding to the normalization information and the first quantization information, to generate a differential normalized frequency spectrum; a second quantization means for linearly quantizing the differential normalized frequency spectrum by use of a second quantization coefficient corresponding to the second quantization information, to generate a differential quantized frequency spectrum; and a code string coding means for coding the normalization information, the first quantization information, the second quantization information, the quantized frequency spectrum, and the differential quantized frequency spectrum, to output a code string, wherein the quantization information calculation means sets a predetermined limit to the first quantization information, allocates the total quantization information for the first quantization information, and allocates an excess beyond the predetermined limit, for the second quantization information, to generate the first quantization information and the second quantization information.

According to an embodiment of the present invention, there is provided an audio coding method including: a time-frequency transform step of performing time-frequency transform on an input audio signal to generate a frequency spectrum; a quantization information calculation step of generating total quantization information indicating a quantization bit number on the basis of predetermined normalization information, and of allocating the total quantization information, to generate first quantization information and second quantization information each indicating a quantization bit number; a first normalization step of normalizing the frequency spectrum for every frequency component by use of a first normalization coefficient corresponding to the normalization information, to generate a normalized frequency spectrum; a first quantization step of linearly quantizing the normalized frequency spectrum by use of a first quantization coefficient corresponding to the first quantization information, to generate a quantized frequency spectrum; a subtraction step of subtracting, from the frequency spectrum, a frequency spectrum obtained by inversely quantizing and inversely normalizing the quantized frequency spectrum, to generate a differential frequency spectrum; a second normalization step of normalizing the differential frequency spectrum by use of a second normalization coefficient corresponding to the normalization information and the first quantization information, to generate a differential normalized frequency spectrum; a second quantization step of linearly quantizing the differential normalized frequency spectrum by use of a second quantization coefficient corresponding to the second quantization information, to generate a differential quantized frequency spectrum; and a code string coding step of coding the normalization information, the first quantization information, the second quantization information, the quantized frequency spectrum, and the differential quantized frequency spectrum, to output a code string, wherein in the quantization information calculation step, a predetermined limit is set to the first quantization information, the total quantization information is allocated for the first quantization information, and an excess beyond the predetermined limit is allocated for the second quantization information, to generate the first quantization information and the second quantization information.

According to an embodiment of the present invention, there is provided an audio coding device including: a time-frequency transform means for performing time-frequency transform on an input audio signal, to generate a frequency spectrum; a quantization information calculation means for generating total quantization information indicating a quantization bit number on the basis of predetermined normalization information, and for allocating the total quantization information, to generate first quantization information and second quantization information each indicating a quantization bit number; a first normalization means for normalizing the frequency spectrum for every frequency component by use of a first normalization coefficient corresponding to the normalization information, to generate a normalized frequency spectrum; a first quantization means for linearly quantizing the normalized frequency spectrum by use of a first quantization coefficient corresponding to the first quantization information, to generate a quantized frequency spectrum; a subtraction means for subtracting, from the frequency spectrum, a frequency spectrum obtained by inversely quantizing and inversely normalizing the quantized frequency spectrum, to generate a differential frequency spectrum; a second normalization means for normalizing the differential frequency spectrum by use of a second normalization coefficient corresponding to the normalization information and the first quantization information, to generate a differential normalized frequency spectrum; a second quantization means for linearly quantizing the differential normalized frequency spectrum by use of a second quantization coefficient corresponding to the second quantization information, to generate a differential quantized frequency spectrum; and a code string coding means for coding the normalization information, the quantized frequency spectrum, and the differential quantized frequency spectrum, to output a code string, wherein the quantization information calculation means sets a predetermined limit to the first quantization information, allocates the total quantization information for the first quantization information, and allocates an excess beyond the predetermined limit, for the second quantization information, to generate the first quantization information and the second quantization information.

According to an embodiment of the present invention, there is provided an audio coding method including: a time-frequency transform step of performing time-frequency transform on an input audio signal to generate a frequency spectrum; a quantization information calculation step of generating total quantization information indicating a quantization bit number on the basis of predetermined normalization information, and of allocating the total quantization information, to generate first quantization information and second quantization information each indicating a quantization bit number; a first normalization step of normalizing the frequency spectrum for every frequency component by use of a first normalization coefficient corresponding to the normalization information, to generate a normalized frequency spectrum; a first quantization step of linearly quantizing the normalized frequency spectrum by use of a first quantization coefficient corresponding to the first quantization information, to generate a quantized frequency spectrum; a subtraction step of subtracting, from the frequency spectrum, a frequency spectrum obtained by inversely quantizing and inversely normalizing the quantized frequency spectrum, to generate a differential frequency spectrum; a second normalization step of normalizing the differential frequency spectrum by use of a second normalization coefficient corresponding to the normalization information and the first quantization information, to generate a differential normalized frequency spectrum; a second quantization step of linearly quantizing the differential normalized frequency spectrum by use of a second quantization coefficient corresponding to the second quantization information, to generate a differential quantized frequency spectrum; and a code string coding step of coding the normalization information, the quantized frequency spectrum, and the differential quantized frequency spectrum, to output a code string, wherein in the quantization information calculation step, a predetermined limit is set to the first quantization information, the total quantization information is allocated for the first quantization information, and an excess beyond the predetermined limit is allocated for the second quantization information, to generate the first quantization information and the second quantization information.

According to an embodiment of the present invention, there is provided an audio coding device including: a time-frequency transform means for performing time-frequency transform on an input audio signal to generate a frequency spectrum; a quantization information calculation means for generating total quantization information indicating a quantization bit number on the basis of predetermined normalization information, and for allocating the total quantization information, to generate first quantization information and second quantization information each indicating a quantization bit number; a first normalization means for normalizing the frequency spectrum for every frequency component by use of a first normalization coefficient corresponding to the normalization information, to generate a normalized frequency spectrum; a first quantization means for linearly quantizing the normalized frequency spectrum by use of a first quantization coefficient corresponding to the first quantization information, to generate a quantized frequency spectrum; a subtraction means for subtracting, from the normalized frequency spectrum, a normalized frequency spectrum obtained by inversely quantizing the quantized frequency spectrum, to generate a differential normalized frequency spectrum; a second normalization means for normalizing the differential normalized frequency spectrum by use of a second normalization coefficient corresponding to the first quantization information, to generate a differential renormalized frequency spectrum; a second quantization means for linearly quantizing the differential renormalized frequency spectrum by use of a second quantization coefficient corresponding to the second quantization information, to generate a differential quantized frequency spectrum; and a code string coding means for coding the normalization information, the first quantization information, the second quantization information, the quantized frequency spectrum, and the differential quantized frequency spectrum, to output a code string, wherein the quantization information calculation means sets a predetermined limit to the first quantization information, allocates the total quantization information for the first quantization information, and allocates an excess beyond the predetermined limit, for the second quantization information, to generate the first quantization information and the second quantization information.

According to an embodiment of the present invention, there is provided an audio coding method including: a time-frequency transform step of performing time-frequency transform on an input audio signal to generate a frequency spectrum; a quantization information calculation step of generating total quantization information indicating a quantization bit number on the basis of predetermined normalization information, and of allocating the total quantization information, to generate first quantization information and second quantization information each indicating a quantization bit number; a first normalization step of normalizing the frequency spectrum for every frequency component by use of a first normalization coefficient corresponding to the normalization information, to generate a normalized frequency spectrum; a first quantization step of linearly quantizing the normalized frequency spectrum by use of a first quantization coefficient corresponding to the first quantization information, to generate a quantized frequency spectrum; a subtraction step of subtracting, from the normalized frequency spectrum, a normalized frequency spectrum obtained by inversely quantizing the quantized frequency spectrum, to generate a differential normalized frequency spectrum; a second normalization step of normalizing the differential normalized frequency spectrum by use of a second normalization coefficient corresponding to the first quantization information, to generate a differential renormalized frequency spectrum; a second quantization step of linearly quantizing the differential renormalized frequency spectrum by use of a second quantization coefficient corresponding to the second quantization information, to generate a differential quantized frequency spectrum; and a code string coding step of coding the normalization information, the first quantization information, the second quantization information, the quantized frequency spectrum, and the differential quantized frequency spectrum, to output a code string, wherein in the quantization information calculation step, a predetermined limit is set to the first quantization information, the total quantization information is allocated for the first quantization information, and an excess beyond the predetermined limit is allocated for the second quantization information, to generate the first quantization information and the second quantization information.

According to an embodiment of the present invention, there is provided an audio decoding device including: a code string decoding means for decoding an input code string, to generate normalization information, a quantized frequency spectrum, and a differential quantized frequency spectrum; a quantization information calculation means for generating total quantization information indicating a quantization bit number on the basis of the normalization information, and for allocating the total quantization information, to generate first quantization information and second quantization information each indicating a quantization bit number; a first inverse quantization means for linearly inversely quantizing the quantized frequency spectrum by use of a first inverse quantization coefficient corresponding to the first quantization information, to generate a normalized frequency spectrum; a first inverse normalization means for inversely normalizing the normalized frequency spectrum by use of a first inverse normalization coefficient corresponding to the normalization information, to generate a frequency spectrum; a second inverse quantization means for linearly inversely quantizing the differential quantized frequency spectrum by use of a second inverse quantization coefficient corresponding to the second quantization information, to generate a differential normalized frequency spectrum; a second inverse normalization means for inversely normalizing the differential normalized frequency spectrum by use of a second inverse normalization coefficient corresponding to the normalization information and the first quantization information, to generate a differential frequency spectrum; an addition means for adding up the frequency spectrum and the differential frequency spectrum; and a frequency-time transform means for performing frequency-time transform on a frequency spectrum obtained by the addition means, to generate an output audio signal, wherein the quantization information calculation means sets a predetermined limit to the first quantization information, allocates the total quantization information for the first quantization information, and allocates an excess beyond the predetermined limit, for the second quantization information, to generate the first quantization information and the second quantization information.

According to an embodiment of the present invention, there is provided an audio decoding method including: a code string decoding step of decoding an input code string, to generate normalization information, a quantized frequency spectrum, and a differential quantized frequency spectrum; a quantization information calculation step of generating total quantization information indicating a quantization bit number on the basis of the normalization information, and of allocating the total quantization information, to generate first quantization information and second quantization information each indicating a quantization bit number; a first inverse quantization step of linearly inversely quantizing the quantized frequency spectrum by use of a first inverse quantization coefficient corresponding to the first quantization information, to generate a normalized frequency spectrum; a first inverse normalization step of inversely normalizing the normalized frequency spectrum by use of a first inverse normalization coefficient corresponding to the normalization information, to generate a frequency spectrum; a second inverse quantization step of linearly inversely quantizing the differential quantized frequency spectrum by use of a second inverse quantization coefficient corresponding to the second quantization information, to generate a differential normalized frequency spectrum; a second inverse normalization step of inversely normalizing the differential normalized frequency spectrum by use of a second inverse normalization coefficient corresponding to the normalization information and the first quantization information, to generate a differential frequency spectrum; an addition step of adding up the frequency spectrum and the differential frequency spectrum; and a frequency-time transform step of performing frequency-time transform on a frequency spectrum obtained by the addition step, to generate an output audio signal, wherein in the quantization information calculation step, a predetermined limit is set to the first quantization information, the total quantization information is allocated for the first quantization information, and an excess beyond the predetermined limit is allocated for the second quantization information, to generate the first quantization information and the second quantization information.

In the audio coding device and the method thereof according to the embodiments of the present invention as well as the audio decoding device and the method thereof according to the embodiments of the present invention, an input audio signal is coded by performing multi-stage normalization/quantization, to generate a code string. When the code string is decoded to obtain an output audio signal, the quantization bit number in each stage can be appropriately set with a small calculation amount.

DETAILED DESCRIPTION OF THE PREFERRED EMBODIMENTS

Embodiments to which the present invention is applied will now be specifically described below with reference to the drawings. In the embodiments, the present invention is applied to an audio coding device and a method thereof by which two-stage normalization/quantization is preformed on frequency spectrums obtained by subjecting an input audio signal to time-frequency transform, to generate a code string. The present invention is also applied to an audio decoding device and a method thereof by which the code string is decoded to obtain an output audio signal.

[First Embodiment]

Figure 1:
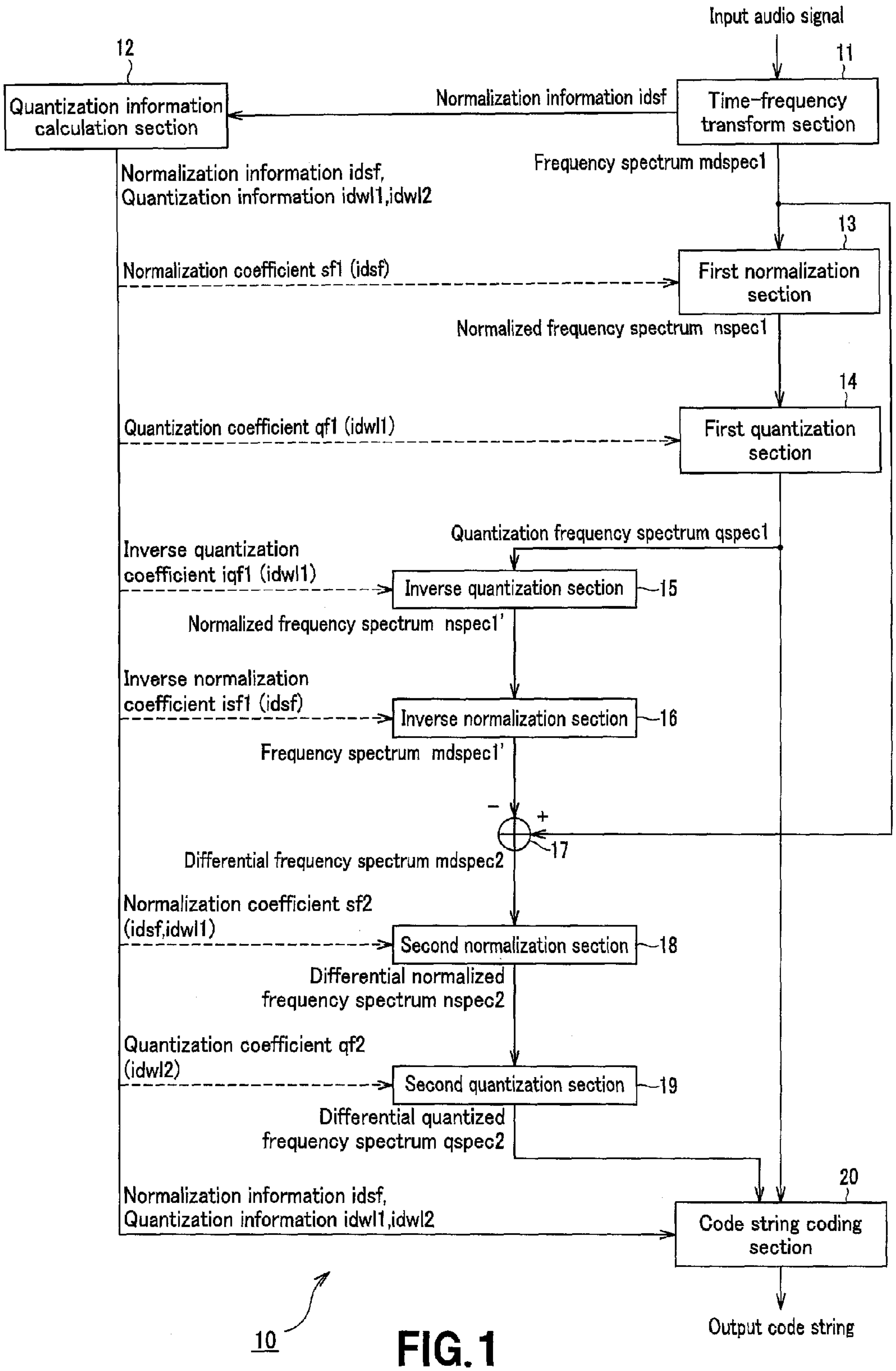
FIG. 1 is a diagram showing schematic structure of an audio coding device according to the first embodiment.
Figure 2:
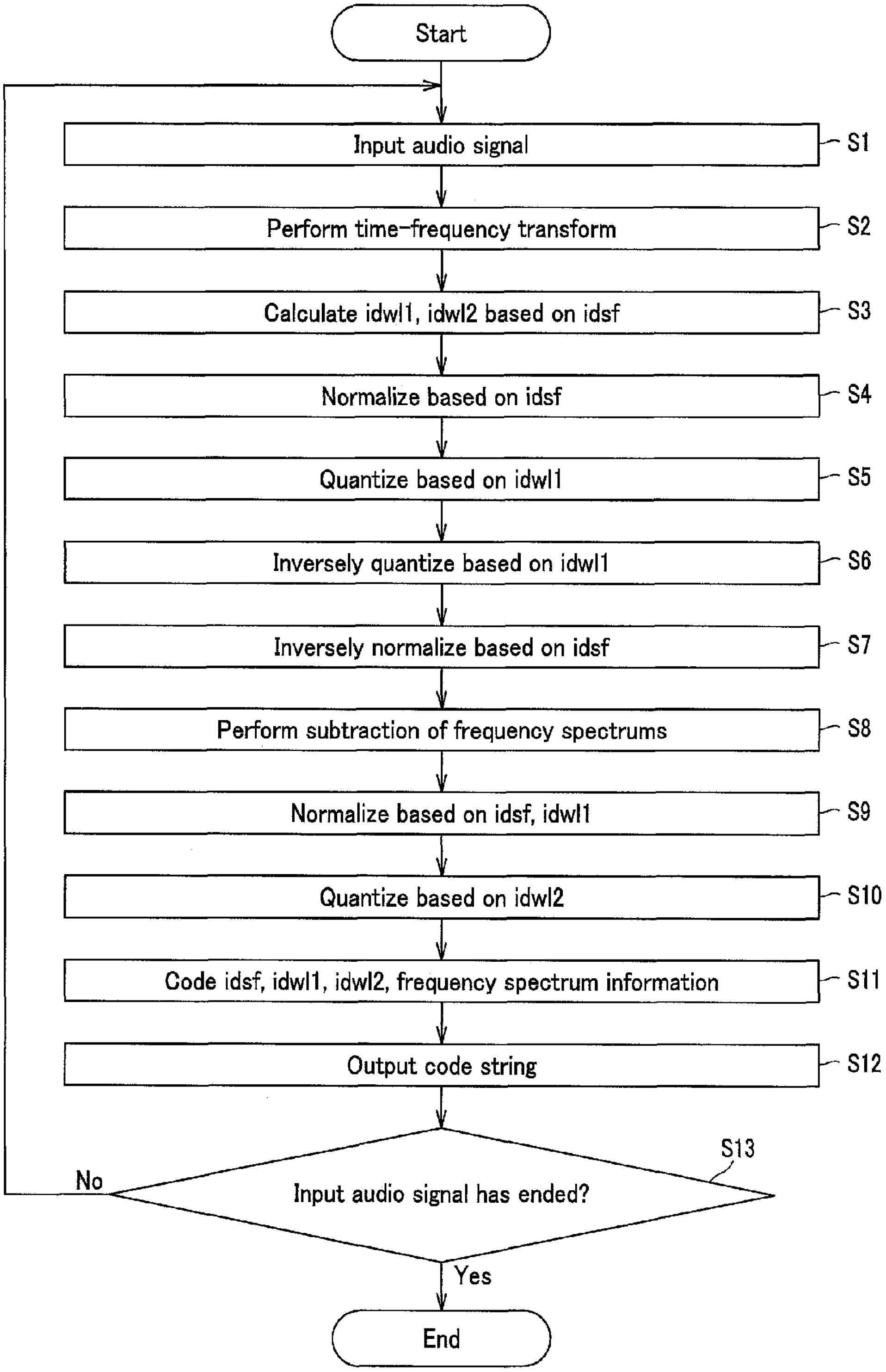
FIG. 2 is a flowchart showing a procedure of coding processing in the audio coding device.

At first, FIG. 1 shows schematic structure of the audio coding device according to the first embodiment. FIG. 2 shows a flowchart of a procedure of coding processing in the audio coding device 10 shown in FIG. 1. Referring to FIG. 1, the flowchart of FIG. 2 will now be described below.

In step S1 in FIG. 2, a time-frequency transform section 11 is inputted with an audio signal (e.g., PCM (Pulse Code Modulation) data) for every predetermined unit time (frame). In step S2, the time-frequency transform section 11 performs time-frequency transform on the input audio signal, to generate a frequency spectrum mdspec1. For example, if modified discrete cosine transform (MDCT) is used as the time-frequency transform, an audio signal of N samples are transferred into MDCT coefficients of N/2 samples. The time-frequency transform section 11 supplies a first normalization section 13 and a subtraction section 17 with the frequency spectrum mdspec1 as well as a quantization information calculation section 12 with normalization information idsf.

Next in step S3, based on the normalization information idsf, the quantization information calculation section 12 determines quantization information idwl1 expressing a quantization bit number to quantize the frequency spectrum mdspec1 and quantization information idwl2 expressing another quantization bit number for quantization in the second stage described later. The processing to determine quantization information idwl1 and idwl2 based on the normalization information idsf and the like in the quantization information calculation section 12 will be described in more details later.

In subsequent step S4, the first normalization section 13 normalizes the frequency spectrum mdspec1 by use of a normalization coefficient sf1 (idsf) corresponding to normalization information idsf, as expressed by the following equation (1):

$$n\text{spec1}=md\text{spec1}\cdot\times\cdot sf1(idsf) \quad (1)$$

The first normalization section 13 supplies a first quantization section 14 with an obtained normalized frequency spectrum nspec1. By this processing, the frequency spectrum mdspec1 is normalized to a range of ±f ∊ R. The relationship between the normalization information idsf and the normalization coefficient sf1(idsf) is expressed as shown in the table 1 below.

TABLE 1

| | idsf | | | | | | | | | |
|---|---|---|---|---|---|---|---|---|---|---|
| | 0 | . . . | 14 | 15 | 16 | 17 | 18 | . . . | 30 | 31 |
| 1/sf1(idsf) | 1/32768 | . . . | ½ | 1 | 2 | 4 | 8 | . . . | 32768 | 65536 |

Figure 3:
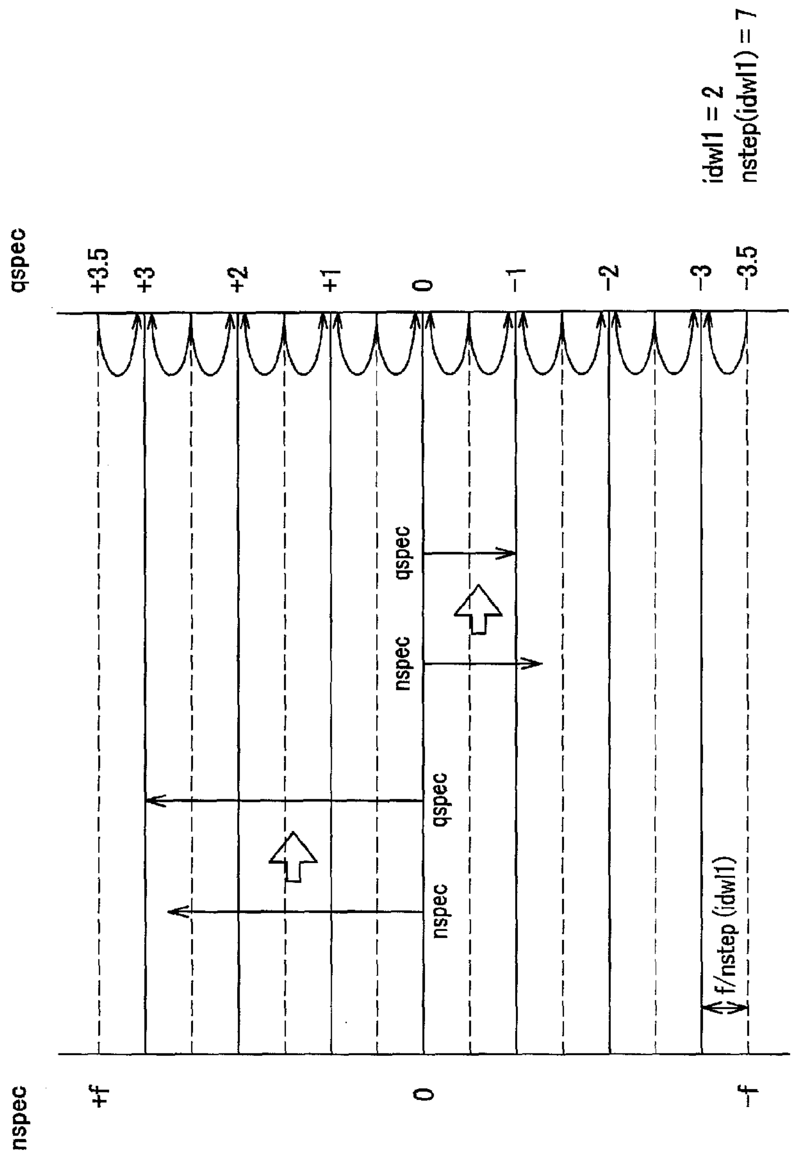
FIG. 3 is a graph showing an example of quantization processing in a first quantization section in the audio coding device.

In subsequent step S5, the first quantization section 14 quantizes the normalized frequency spectrum nspec1 by use of a quantization coefficient qf1(idwl1) corresponding to quantization information idwl1. The first quantization section 14 supplies an inverse quantization section 15 and a code string coding section 20 with a quantized frequency spectrum qspec1 obtained. For example, if linear quantization is performed as shown in FIG. 3, the quantized frequency spectrum qspec1 is obtained as expressed below by the following equation (2):

$$q\text{spec1}=(\text{int})(\text{floor}(n\text{spec1}\cdot\times\cdot qf1(idwl1))+0.5) \quad (2)$$

By this processing, the normalization frequency spectrum nspec1 is quantized to a quantized frequency spectrum qspec1 having step number expressed by a quantization step width nstep(idwl1). The relationship between the quantization information idwl1, quantization step width nstep(idwl1), and quantization coefficient qf1(idwl1) is expressed as shown in the table 2 below.

TABLE 2

| | idwl1 | | | | | | |
|---|---|---|---|---|---|---|---|
| | . . . | 2 | 3 | 4 | 5 | 6 | 7 | . . . |
| nstep (idwl1) | . . . | 3(±1) | 7(±3) | 15(±7) | 31(±15) | 63(±31) | 127(±63) | . . . |
| qf1 (idwl1) | . . . | 1.5 | 3.5 | 7.5 | 15.5 | 31.5 | 63.5 | . . . |

In subsequent step S6, the inverse quantization section 15 inversely quantizes the quantized frequency spectrum qspec1 by use of an inverse quantization coefficient iqf1(idwl1) corresponding to quantization information idwl1, as expressed below by the following equation (3):

$$nspec1' = qspec1 \times iqf1(idwl1) \quad (3)$$

The inverse quantization section 15 supplies an inverse normalization section 16 with an obtained normalization frequency spectrum nspec1'. The relationship between the quantization coefficient qf1(idwl1) and the inverse quantization coefficient iqf1(idwl1) is expressed below by the equation (4):

$$iqf1(idwl1) = 1/qf1(idwl1) \quad (4)$$

In subsequent step S7, the inverse normalization section 16 inversely normalizes the normalized frequency spectrum nspec1' by use of an inverse normalization coefficient isf1(idsf) corresponding to the normalization information idsf, as expressed below by the following equation (5):

$$mdspec1' = nspec1' \times isf1(idsf) \quad (5)$$

The inverse normalization section 16 supplies the subtraction section 17 with an obtained frequency spectrum mdspec1'. The relationship between the normalization coefficient sf1(idsf) and the inverse normalization coefficient isf1(idsf) is expressed below by the equation (6):

$$isf1(idsf) = 1/sf1(idsf) \quad (6)$$

In subsequent step S8, the subtraction section 17 subtracts the frequency spectrum mdspec1' from the frequency spectrum mdspec1, as expressed by the following equation (7):

$$mdspec2 = mdspec1 - mdspec1' \quad (7)$$

The subtraction section 17 supplies a second normalization section 18 with an obtained differential frequency spectrum mdspec2.

In subsequent step S9, the second normalization section 18 normalizes the differential frequency spectrum mdspec2 by use of a normalization coefficient sf2, as expressed by the following equation (8):

$$\begin{aligned} nspec2 &= mdspec2 * sf2 \\ &= (mdspec1 - mdspec1') * sf2 \\ &= ((nspec1 - nspec1') * isf1(idsf)) * sf2 \end{aligned} \quad (8)$$

The second normalization section 18 supplies a second quantization section 19 with an obtained differential normalized frequency spectrum nspec2.

The normalized frequency spectrum nspec1 is normalized to a range of $\pm f \in R$ by the normalization coefficient sf1(idsf) corresponding to the normalization information idsf. Therefore, in case of performing linear quantization by which the quantization step width nstep(idwl1) is uniquely determined in correspondence with the quantization information idwl1, for example as shown in FIG. 3, the difference between the normalized frequency spectrums nspec1 and nspec1' before and after the quantization falls within a range of ±f/nstep (idwl1) as a maximum quantization error. Accordingly, the normalization coefficient sf2 can be calculated as expressed below by the equation (9):

$$sf2(idsf, idwl1) = sf1(idsf) \times nstep(idwl1)/f \quad (9)$$

That is, the normalization coefficient sf2(idsf,dw11) can be calculated based on the normalization information idsf and the quantization information idwl1.

In subsequent step S10, the second quantization section 19 quantizes the differential normalized frequency spectrum nspec2 by use of the quantization coefficient qf2(idwl2) corresponding to the quantization information idwl2. The second quantization section 19 supplies the code string coding section 20 with an obtained differential quantized frequency spectrum qspec2. For example, in case of performing linear quantization as shown in FIG. 3, the differential quantized frequency spectrum qspec2 can be obtained as expressed below by the following equation (10):

$$qspec2 = (int)(floor(nspec2 \times qf2(idwl2)) + 0.5) \quad (10)$$

The relationship between the quantization information idwl2 and the quantization coefficient qf2(idwl2) may be identical with or different from that in the table 2 described previously.

In subsequent step S11, the code string coding section 20 codes the quantized frequency spectrum qspec1, differential quantized frequency spectrum qspec2, normalization information idsf, quantization information idwl1, and quantization information idwl2. In step S12, the code string coding section 20 outputs an obtained code string.

In subsequent step S13, whether an input audio signal has ended or not is determined. If the input audio signal has not ended, the processing procedure returns to step S1. Otherwise, if the input audio signal has ended, the coding processing is terminated.

Hereinafter, a detailed description will be made of processing of determining the quantization information idwl1 and idwl2 on the basis of the normalization information idsf in the quantization information calculation section 12. In the following description, a consideration is taken into a case of calculating the quantization information idwl1 and idwl2 for every processing unit, with respect to frequency spectrums having spectral envelope curves a drawn by continuous lines in FIGS. 4 and 5.

Figure 4:
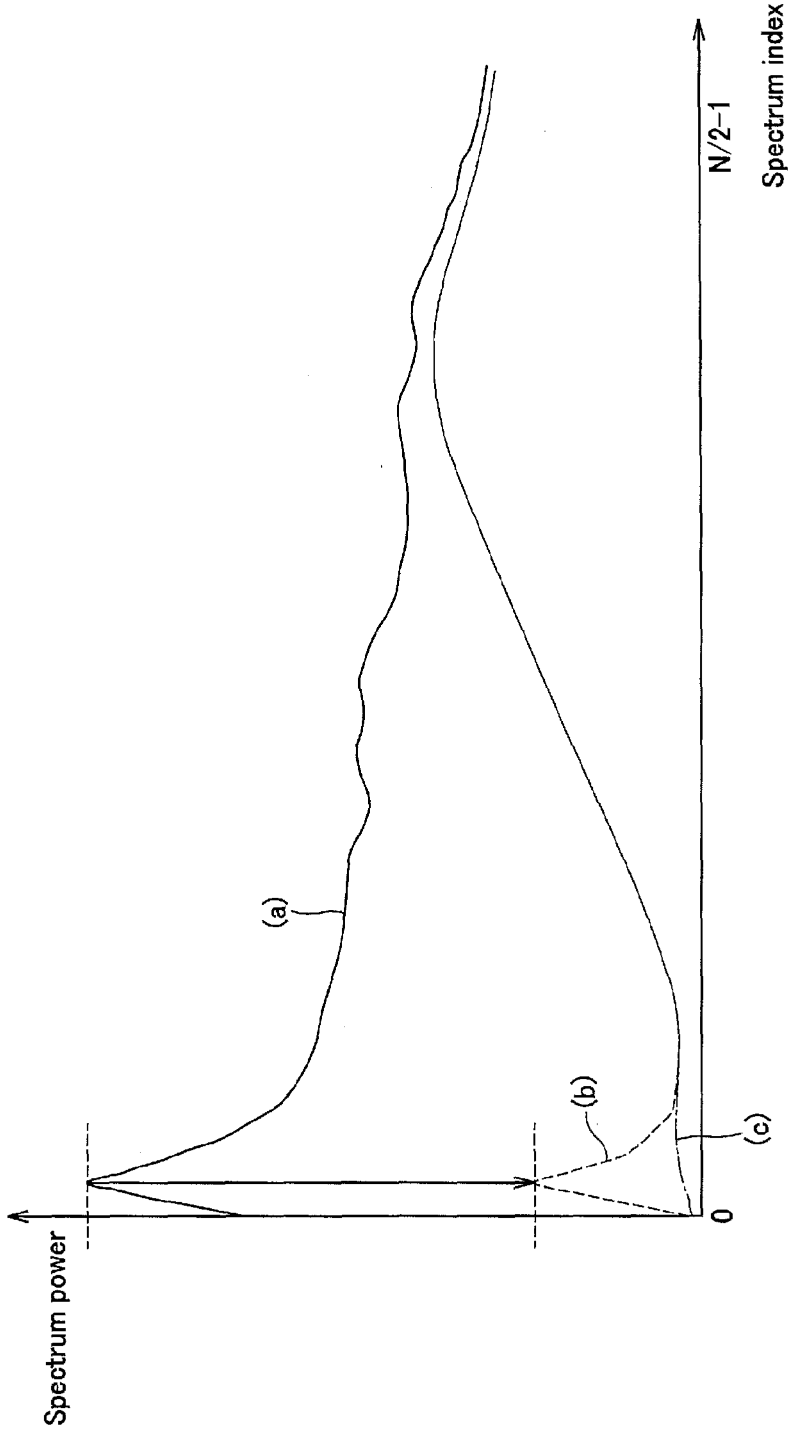
FIG. 4 is a graph showing examples of a spectral envelope curve before quantization and a noise floor after quantization.
Figure 5:
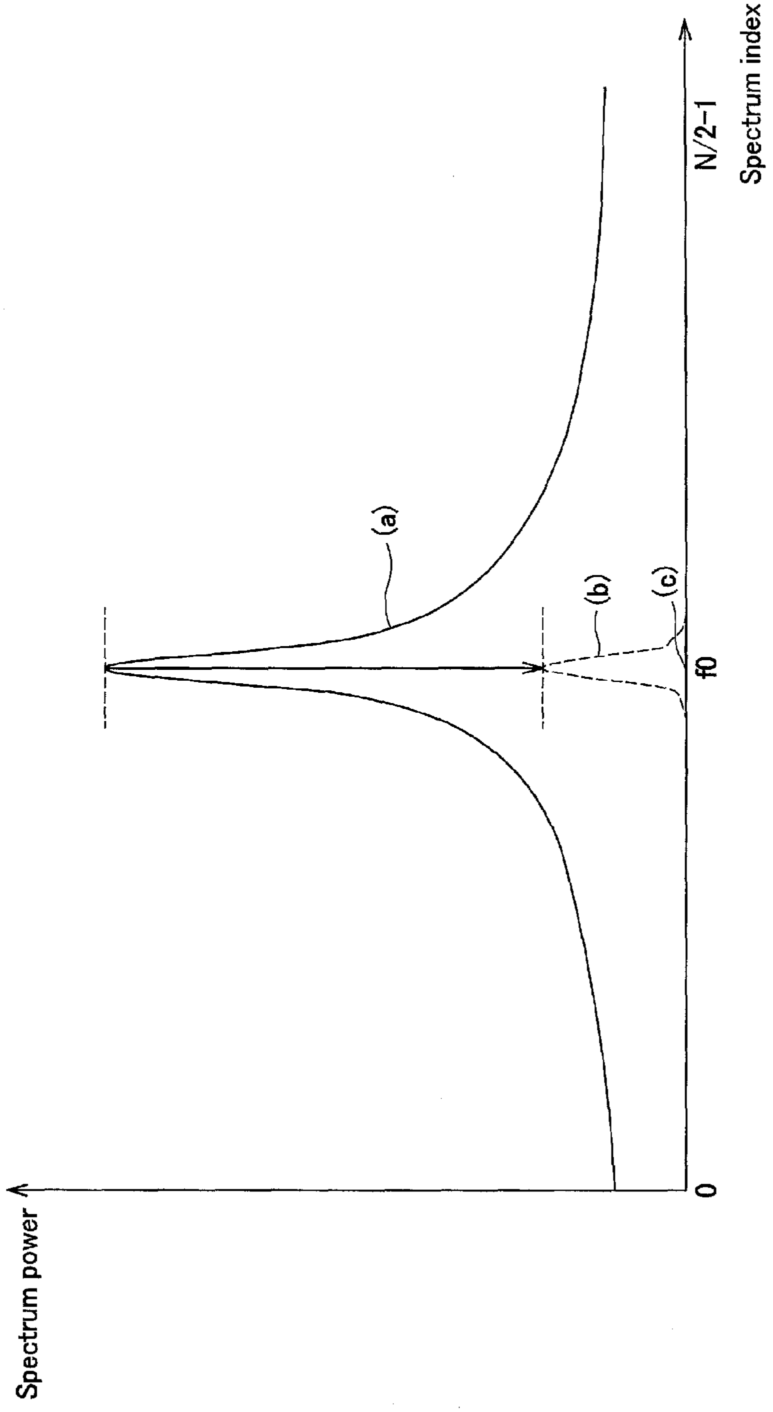
FIG. 5 is a graph showing other examples of a spectral envelope curve before quantization and a noise floor after quantization.

At first, the total quantization information idwl0 is calculated based on the normalization information idsf or the like. For example, in case of a frequency spectrum having the spectral envelope curve as shown in FIG. 4, the total quantization information idwl0 as shown below in the upper row in the table 3 is calculated. In case of another frequency spectrum having the spectral envelope curve as shown in FIG. 5, the total quantization information idwl0 as shown below in the upper row in the table 4 is calculated.

TABLE 3

| | Index of spectrums | | | | | | | | | | | | |
|---|---|---|---|---|---|---|---|---|---|---|---|---|---|
| | 0 | 1 | 2 | 3 | 4 | 5 | 6 | 7 | ... | N/2 − 4 | N/2 − 3 | N/2 − 2 | N/2 − 1 |
| idwl0 | 18 | 20 | 17 | 15 | 10 | 12 | 11 | 9 | ... | 2 | 1 | 0 | 1 |
| idwl1 | 15 | 15 | 15 | 15 | 10 | 12 | 11 | 9 | ... | 2 | 1 | 0 | 1 |
| idwl2 | 3 | 5 | 2 | 0 | 0 | 0 | 0 | 0 | ... | 0 | 0 | 0 | 0 |

lim1 = lim2 = 15

TABLE 4

| | Index of spectrums | | | | | | | | | | | | |
|---|---|---|---|---|---|---|---|---|---|---|---|---|---|
| | 0 | 1 | ... | f0 − 3 | f0 − 2 | f0 − 1 | f0 | f0 + 1 | f0 + 2 | f0 + 3 | ... | N/2 − 2 | N/2 − 1 |
| idwl0 | 0 | 0 | ... | 17 | 18 | 20 | 23 | 20 | 18 | 17 | ... | 0 | 0 |
| idwl1 | 0 | 0 | ... | 15 | 15 | 15 | 15 | 15 | 15 | 15 | ... | 0 | 0 |
| idwl2 | 0 | 0 | ... | 2 | 3 | 5 | 8 | 5 | 3 | 2 | ... | 0 | 0 |

lim1 = lim 2 = 15

If the maximum quantization bit number of, for example, 24 (bits) or so can be ensured by calculator simulation or large-scale hardware, quantization can be achieved based on the total quantization information idwl0. In normal cases, however, there are difficulties in granting limitless permission to the total quantization information idwl0. For example, the quantization bit number is limited to 16 (bits) at maximum. Therefore, higher quantization accuracy than that with a maximum SNR (Signal to Noise Ratio) of 16-bit quantization is not ensured with respect to a frequency spectrum which has to be of 16 or higher in total quantization information idwl0, i.e., a quantization bit number of 16 (bits) or higher. Noise floors as drawn by broken lines b in FIGS. 4 and 5 are obtained. That is, in case of FIG. 4, the SNR deteriorates within a low-frequency range. In case of FIG. 5, the SNR deteriorates near a tone center f0.

Therefore, quantization in the second stage is performed on the differential frequency spectrum as an error obtained as a result of quantization in the first stage, to improve the SNR which has locally deteriorated. No method of setting appropriately the quantization bit number in each stage with a small calculation amount has been established.

Hence, the quantization information calculation section 12 in the present embodiment uses predetermined limiters lim1 and lim2 to set appropriately the quantization bit number in each stage with a small calculation amount. That is, the quantization information idwl1 in the first quantization section 14 is limited by the limiter lim1. If this limit is exceeded, the excess over the limit is allocated for quantization information idwl2 in the second quantization section 19. The quantization information idwl2 in the second quantization section 19 is limited by the other limiter lim2. If this limit is exceeded, the quantization information idwl2 is set to fall within the limit.

Figure 6:
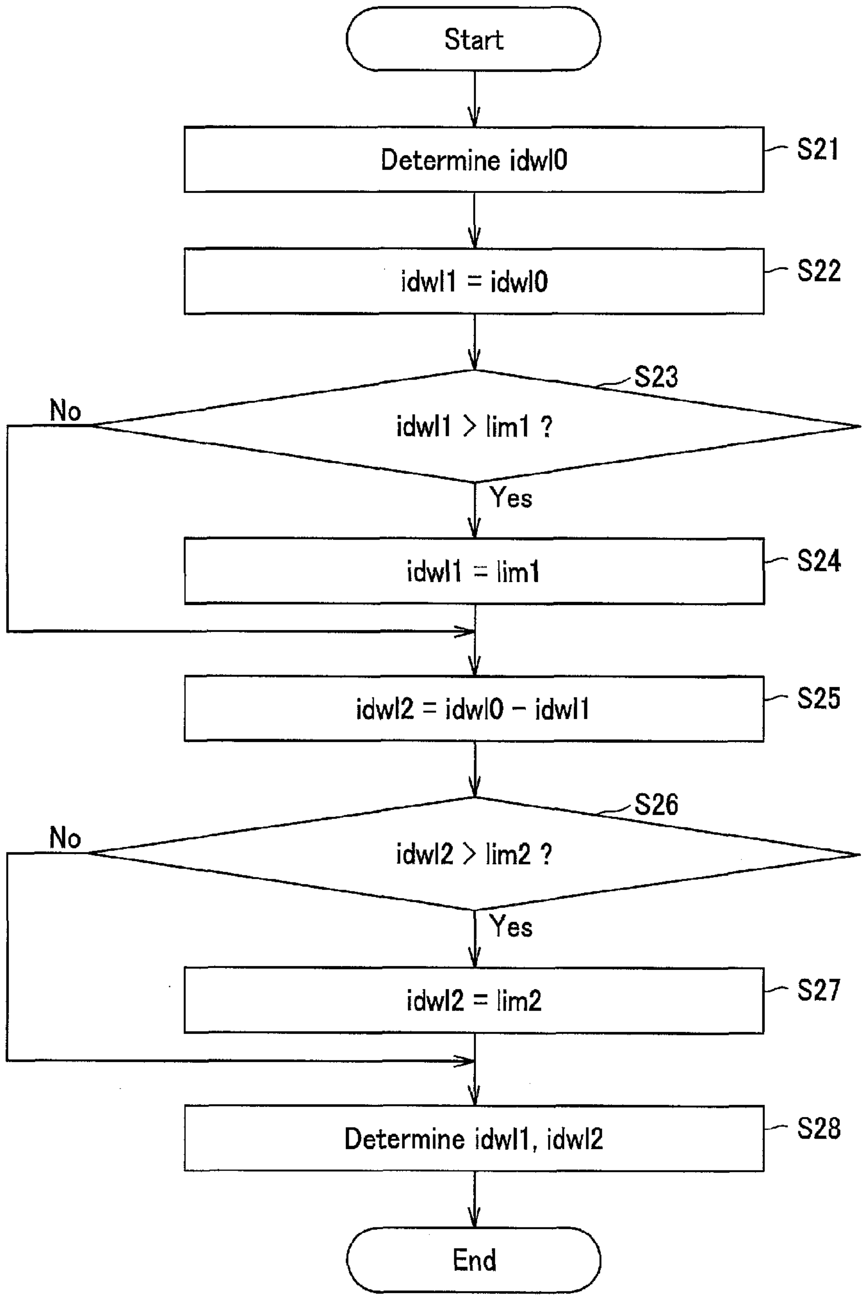
FIG. 6 is a flowchart showing a procedure of processing in a quantization information calculation section in the audio coding device.

The processing procedure of the quantization information calculation section 12 is shown in the flowchart of FIG. 6. At first in step S21, the total quantization information idwl0 is determined based on the normalization information idsf or the like. In step S22, the total quantization information idwl0 is set as the quantization information idwl1.

Next in step S23, whether the value of the quantization information idwl1 is greater than the value of the limiter lim1 or not. If the value of the quantization information idwl1 is not greater than the value of the limiter lim1, the processing procedure goes to step S25. Otherwise, if the value of the quantization information idwl1 is greater than the value of the limiter lim1, the value of the quantization information idwl1 is limited to the value of the limiter lim1, in step S24, and the processing procedure then goes to step S25.

Next in step S25, a value obtained by subtracting the value of the quantization information idwl1 from the value of the total quantization information idwl0 is set as the value of the quantization information idwl2.

In a subsequent step S26, whether the value of the quantization information idwl2 is greater than the value of the limiter lim2 or not is determined. If the value of the quantization information idwl2 is not greater than the value of the limiter lim2, the quantization information idwl1 and the quantization information idwl2 are determined, in step S28. Otherwise, if the value of the quantization information idwl2 is greater than the value of the limiter lim2, the value of the quantization information idwl2 is limited to the value of the limiter lim2, in step S27, and thereafter, the quantization information idwl1 and the quantization information idwl2 are determined, in step S28.

For example, if the total quantization information idwl0 has been calculated as shown in the upper rows in the tables 3 and 4 described above, the quantization information idwl1 and the quantization information idwl2 are determined as shown in the middle and lower rows in each of the tables 3 and 4. In these tables, the maximum quantization bit number in the first quantization section 14 is set to 16 (bits), so that the quantization information idwl1 falls within a range from 0 to 15 (nstep(idwl1)=65535(±32767)<2^16 where idwl1=15). Therefore, the value of the limiter lim1 is set to 15 with respect to the quantization information idwl1. Further, the total quantization information idwl0 limited by the limiter lim1 (=15) is set as the quantization information idwl1, and quantization information of an excess (idwl0−idwl1) is set as the quantization information idwl2.

By use of the quantization information idwl1 and the quantization information idwl2 thus determined, frequency spectrums having spectral envelope curves drawn by continuous lines a in FIGS. 4 and 5 are quantized. Noise floors obtained in these cases are drawn by dashed lines c in FIGS. 4 and 5. As can be seen from FIGS. 4 and 5, the audio coding device 10 according to the present embodiment is capable of requantizing, in an appropriate bit allocation, a differential frequency spectrum as an error obtained as a result of quantization. The SNR which has locally deteriorated due to hardware limitations or the like can be improved.

Figure 7:
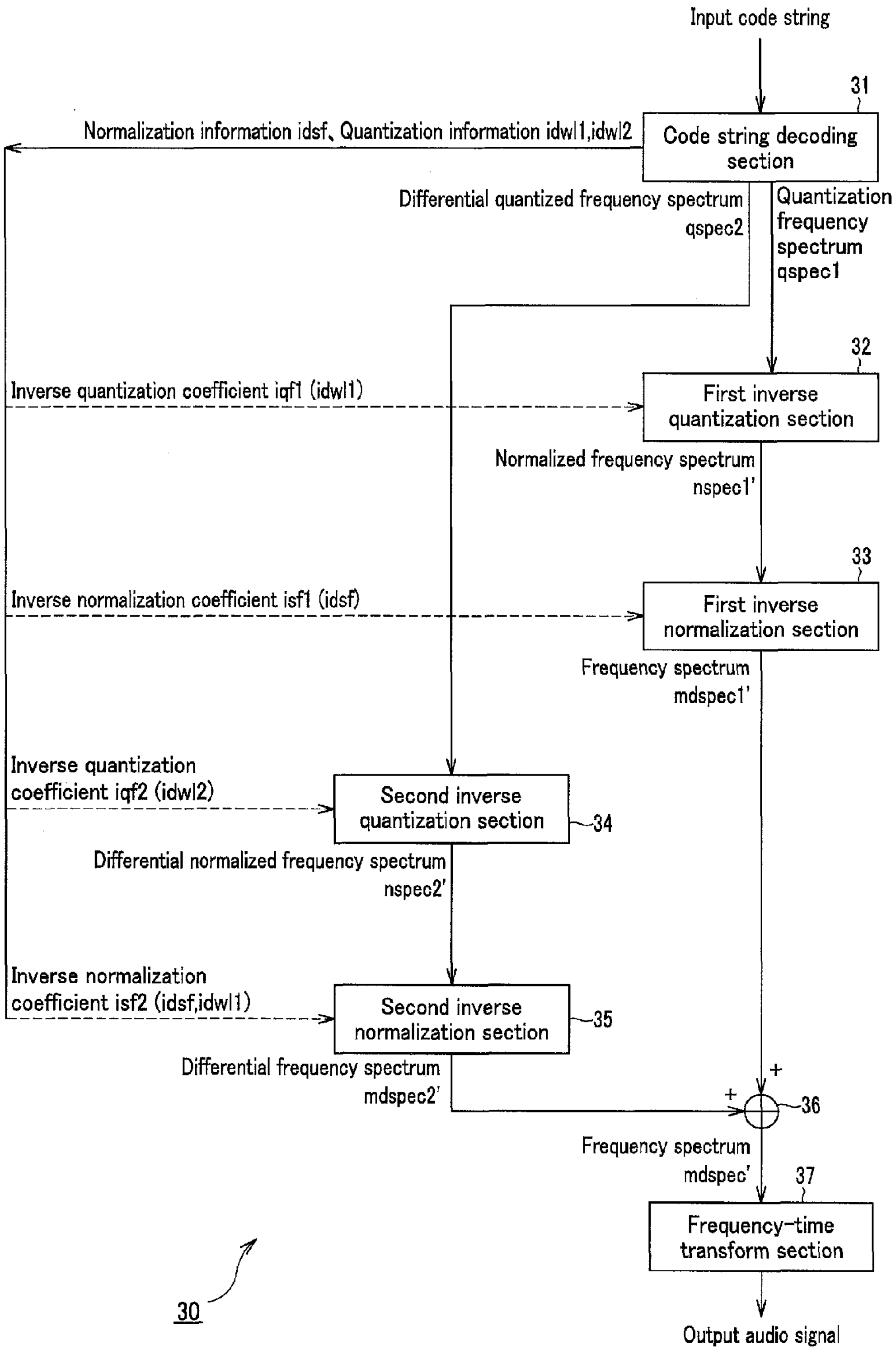
FIG. 7 is a diagram showing schematic structure of an audio decoding device corresponding to the audio coding device shown in FIG. 1.
Figure 8:
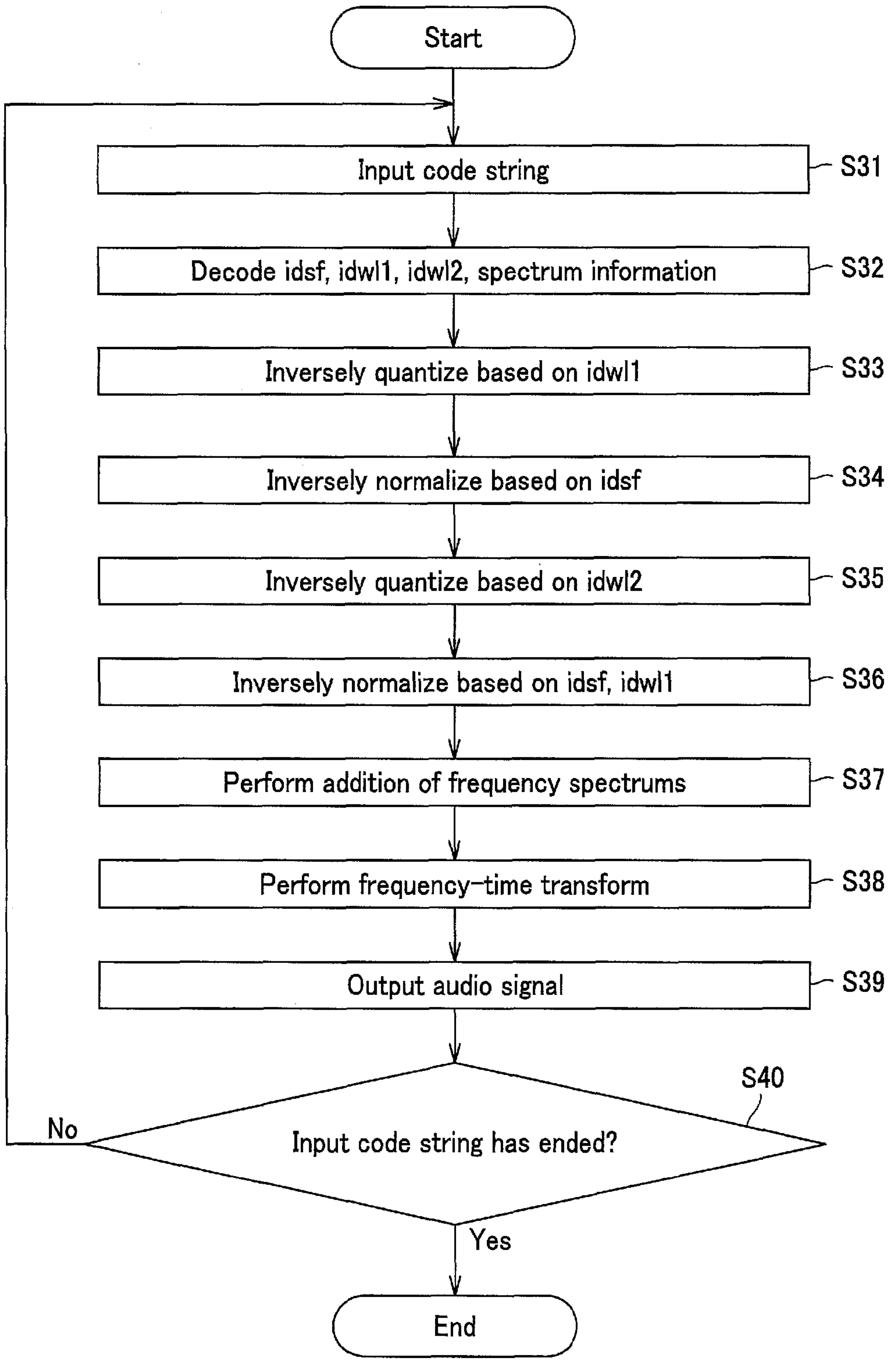
FIG. 8 is a flowchart showing a procedure of decoding processing in the audio decoding device.

Next, schematic structure of an audio decoding device corresponding to the audio coding device 10 is shown in FIG. 7. A procedure of decoding processing in the audio decoding device 30 shown in FIG. 7 is shown in the flowchart of FIG. 8. Hereinafter, the flowchart of FIG. 8 will be described referring to FIG. 7.

In step S31 shown in FIG. 8, a code string decoding section 31 inputs a code string. In step S32, the code string decoding section 31 decodes this input code string to generate a quantized frequency spectrum qspec1, differential quantized frequency spectrum qspec2, normalization information idsf, quantization information idwl1, and quantization information idwl2. The code string decoding section 31 supplies a first inverse quantization section 32 with the quantized frequency spectrum qspec1, as well as a second inverse quantization section 34 with the differential quantized frequency spectrum qspec2.

Next in step S33, the first inverse quantization section 32 inversely quantizes the quantized frequency spectrum qspec1 by use of an inverse quantization coefficient iqf1(idwl1) corresponding to the quantization information idwl1, as expressed by the following equation (11):

$$nspec1' = qspec1 \times iqf1(idwl1) \quad (11)$$

The first inverse quantization section 32 supplies a first inverse normalization section 33 with an obtained normalized frequency spectrum nspec1'. The relationship between the quantization coefficient qf1(idwl1) and the inverse quantization coefficient iqf1(idwl1) is expressed by the equation (4) described previously.

In subsequent step S34, the first inverse normalization section 33 inversely normalizes the normalized frequency spectrum nspec1' by use of an inverse normalization coefficient isf1(idsf) corresponding to the normalization information idsf, as expressed by the following equation (12):

$$mdspec1' = nspec1' \times isf1(idsf) \quad (12)$$

The first inverse normalization section 33 supplies an addition section 36 with an obtained frequency spectrum mdspec1'. The relationship between the normalization coefficient sf1(idsf) and the inverse normalization coefficient isf1 (idsf) is expressed by the equation (6) described previously.

In subsequent step S35, the second inverse quantization section 34 inversely quantizes the differential quantized frequency spectrum qspec2 by use of an inverse quantization coefficient iqf2(idwl2) corresponding to the quantization information idwl2, as expressed by the following equation (13):

$$nspec2' = qspec2 \times iqf2(idwl2) \quad (13)$$

The second inverse quantization section 34 supplies a second inverse normalization section 35 with an obtained differential normalized frequency spectrum nspec2'. The relationship between the quantization coefficient qf2(idwl2) and the inverse quantization coefficient iqf2(idwl2) is expressed by the following equation (14):

$$iqf2(idwl2) = 1/qf2(idwl2) \quad (14)$$

In subsequent step S36, a second inverse normalization section 35 inversely normalizes the differential normalized frequency spectrum nspec2' by use of an inverse normalization coefficient isf2(idsf,idwl1) corresponding to the normalization information idsf and the quantization information idwl1, as expressed by the following equation (15):

$$mdspec2' = nspec2' \times isf2(idsf, idwl1) \quad (15)$$

The second inverse normalization section 35 supplies the addition section 36 with an obtained differential frequency spectrum mdspec2'. The relationship between the inverse normalization coefficient isf2(idsf,idwl1), normalization information idsf, and quantization information idwl1 is expressed by the following equation (16):

$$isf2(idsf, idwl1) = 1/sf2(idsf, idwl1) = isf1(idsf) \times f/nstep(idwl1) \quad (16)$$

The processings of steps S35 and S36 may be executed either before or in parallel with the processings of steps S33 and S34.

In subsequent step S37, the addition section 36 adds up the frequency spectrum mdspec1' and the differential frequency spectrum mdspec2', as expressed by the following equation (17):

$$mdspec' = mdspec1' + mdspec2' \quad (17)$$

The addition section 36 supplies a frequency-time transform section 37 with an obtained frequency spectrum mdspec'.

In subsequent step S38, the frequency-time transform section 37 performs frequency-time transform on the frequency spectrum mdspec' to generate an audio signal. In step S39, the frequency-time transform section 37 outputs this audio signal. For example, if inverse MDCT (IMDCT) is used as the frequency-time transform, a MDCT coefficient of N/2 samples is transformed into an audio signal of N samples.

In subsequent step S40, whether an input code string has ended or not is determined. If not, the processing procedure returns to step S31. Otherwise, if the input code string has ended, the decoding processing is terminated.

[Second Embodiment]

In case of performing two-stage normalization/quantization as described above, the quantization information idwl1 in the first stage and the quantization information idwl2 in the second stage have to be coded. Therefore, the coding efficiency of frequency spectrum information lowers in accordance with the number of stages. Hence, the present embodiment will now be described with respect to a method of improving coding efficiency of frequency spectrum information by omitting the coding of the quantization information idwl1 and quantization information idwl2.

Figure 9:
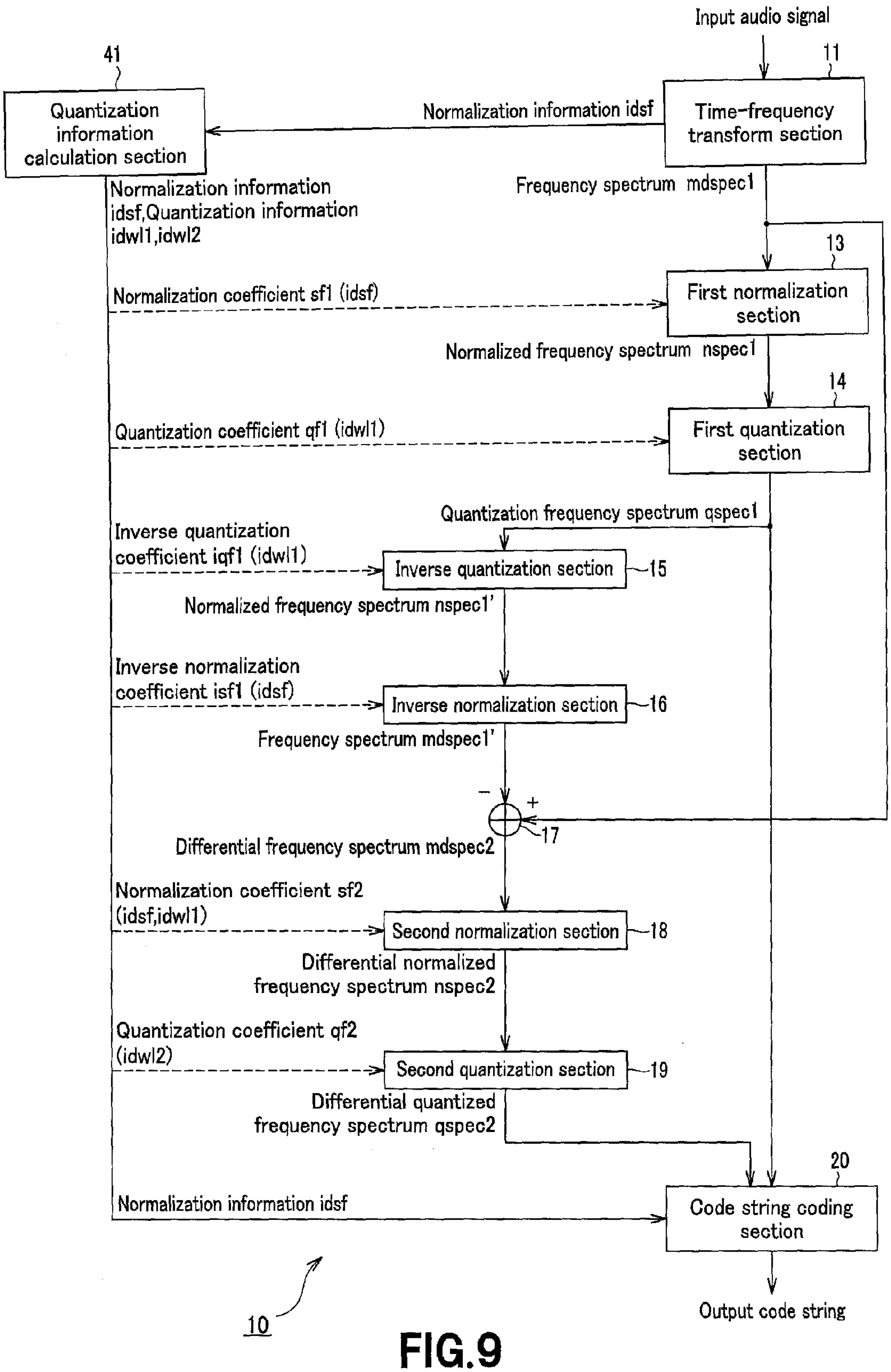
FIG. 9 is a diagram showing schematic structure of an audio coding device according to the second embodiment.
Figure 10:
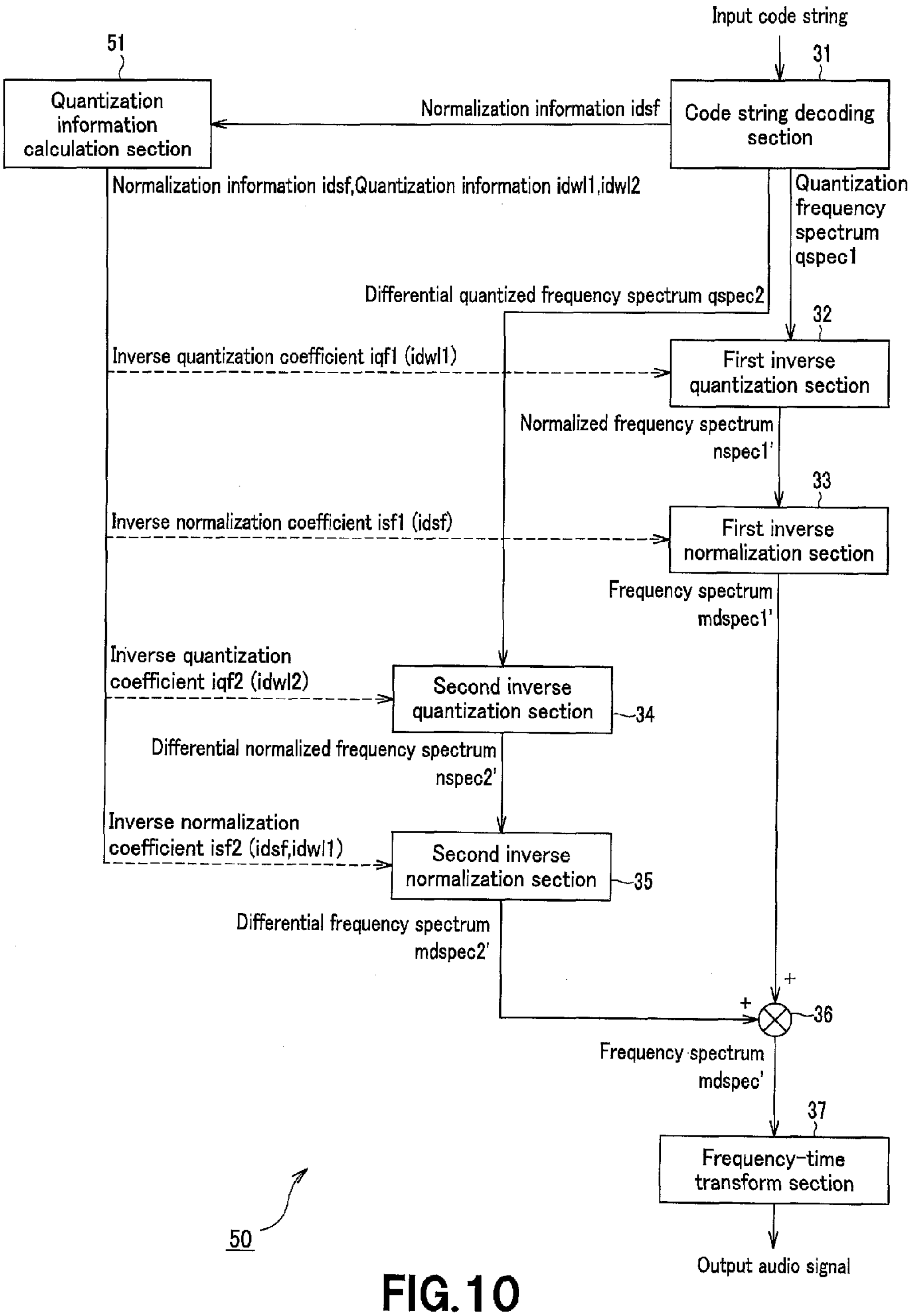
FIG. 10 is a diagram showing schematic structure of an audio decoding device corresponding to the audio coding device shown in FIG. 9.

FIG. 9 shows schematic structure of an audio coding device 40 according to the present embodiment. FIG. 10 shows schematic structure of an audio decoding device 50 corresponding to the audio coding device 40. In both of these devices, the same structural features as those of the audio coding device 10 and audio decoding device 30 described previously are denoted at the same reference symbols. Detailed descriptions thereof will be omitted herefrom.

In this audio coding device 40, an quantization information calculation section 41 uniquely determines quantization information idwl1 and quantization information idwl2, based on normalization information idsf and the like. Processing of uniquely determining the quantization information idwl1 and quantization information idwl2 based on the normalization information idsf and the like in the quantization information calculation section 41 will be specifically described later. The code string coding section 20 codes a quantized frequency spectrum qspec1, differential quantized frequency spectrum qspec2, and normalization information idsf, and outputs an obtained code string.

On the other side, in the audio decoding device 50, a quantization information calculation section 51 uniquely determines quantization information idwl1 and quantization information idwl2, based on the normalization information idsf and the like. Processing of uniquely determining the quantization information idwl1 and quantization information idwl2 based on the normalization information idsf and the like in the quantization information calculation section 51 will also be specifically described later.

Hereinafter, the processing of uniquely determining the quantization information idwl1 and quantization information idwl2 based on the normalization information idsf and the like in the quantization information calculation sections 41 and 51 will now be described specifically.

The quantization information calculation sections 41 and 51 uniquely determine quantization information idwl0 from normalization information idsf and a predetermined parameter A, as shown in the table 5 below.

TABLE 5

| | idsf | | | | | | | | | | |
|---|---|---|---|---|---|---|---|---|---|---|---|
| | 31 | 30 | 29 | 28 | 27 | . . . | 17 | 16 | 15 | 14 | . . . | 0 |
| idwl0 | A | A-1 | A-2 | A-3 | A-4 | . . . | A-14 | A-15 | A-16 | A-17 | . . . | A-31 |

As can be seen from this table 5, the quantization information idwl0 decreases by one as the normalization information idsf decreases by one. This is achieved by paying attention to the following. Suppose that the absolute SNR is SNRabs where the normalization information idsf is X and the quantization information is B. On this supposition, if the normalization information idsf is X-1, a quantization bit number indicated by the quantization information of substantial B-1 is necessary, in order to obtain an equivalent SNRabs. Alternatively, if the normalization information idsf is X-2, a quantization bit number indicated by the quantization information of substantial B-2 is necessary.

The parameter A described previously means the maximum quantization information assigned to the maximum normalization information idsf. This value is included as additional information in a code string. A maximum quantization bit number which is available from the standard is firstly set as the parameter A. If the total number of used bits exceeds the total usable number of bits, as a result of coding, the parameter A is decreased one by one.

In case where the value of the parameter A is 17 (bits), an example of a table representing the relationship between the normalization information idsf and the quantization information idwl0 is shown in the table 6 below. In this table 6, circled numbers each represent the total quantization information idwl0 determined for every spectrum.

ization information idsf is 29 which is smaller by two than the maximum normalization information idsf, the total quantization information idwl0 is 15. If corresponding normalization information idsf is smaller by 17 or more than the maximum normalization information idsf, the quantization bit number is a minus value. In this case, a lower limit of zero (bit) is set.

The quantization information calculation sections 41 and 51 determine the quantization information idwl1 and the quantization information idwl2, based on the total quantization information idwl0 thus obtained for every spectrum. That is, the quantization information idwl1 is limited by a limiter lim1. If this limit is exceeded, the excess is allocated for the quantization information idwl2. The quantization information idwl2 is limited by the limiter lim2. If this limit is exceeded, the quantization information idwl2 is set to fall within the limit.

If the quantization information idwl1 and the quantization information idwl2 are thus uniquely determined, noise floors are substantially flat. That is, quantization is performed with equal quantization accuracy with respect to a low-frequency range which is important for human auditory sense as well as a high-frequency range which is not. Therefore, audible noise is not minimized.

Hence, in the quantization information calculation sections 41 and 51, the normalization information idsf for every spectrum may be added with a weighting coefficient Wn[i](i=0 to N/2−1), to generate new normalization information idsf1, as shown in the table 7 below.

TABLE 6

| Abscissa axis = Index of spectrums, Ordinate axis = Normalization information | | | | | | | | | | | | | | |
|---|---|---|---|---|---|---|---|---|---|---|---|---|---|---|
| | 0 | 1 | 2 | 3 | 4 | 5 | 6 | 7 | . . . | N/2 − 5 | N/2 − 4 | N/2 − 3 | N/2 − 2 | N/2 − 1 |
| 31 | (17) | 17 | 17 | 17 | 17 | 17 | 17 | 17 | . . . | 17 | 17 | 17 | 17 | 17 |
| 30 | 16 | 16 | 16 | 16 | 16 | 16 | 16 | 16 | . . . | 16 | 16 | 16 | 16 | 16 |
| 29 | 15 | (15) | 15 | 15 | 15 | 15 | 15 | 15 | . . . | 15 | 15 | 15 | 15 | 15 |
| 28 | 14 | 14 | 14 | 14 | (14) | 14 | 14 | 14 | . . . | 14 | 14 | 14 | 14 | 14 |
| 27 | 13 | 13 | (13) | 13 | 13 | (13) | 13 | 13 | . . . | 13 | 13 | 13 | 13 | 13 |
| 26 | 12 | 12 | 12 | (12) | 12 | 12 | (12) | (12) | . . . | 12 | 12 | 12 | 12 | 12 |
| . . . | . . . | . . . | . . . | . . . | . . . | . . . | . . . | . . . | . . . | . . . | . . . | . . . | . . . | . . . |
| 18 | 4 | 4 | 4 | 4 | 4 | 4 | 4 | 4 | . . . | 4 | 4 | 4 | 4 | 4 |
| 17 | 3 | 3 | 3 | 3 | 3 | 3 | 3 | 3 | . . . | (3) | 3 | 3 | 3 | 3 |
| 16 | 2 | 2 | 2 | 2 | 2 | 2 | 2 | 2 | . . . | 2 | 2 | (2) | 2 | 2 |
| 15 | 1 | 1 | 1 | 1 | 1 | 1 | 1 | 1 | . . . | 1 | (1) | 1 | 1 | 1 |
| 14 | 0 | 0 | 0 | 0 | 0 | 0 | 0 | 0 | . . . | 0 | 0 | 0 | 0 | (0) |
| 13 | 0 | 0 | 0 | 0 | 0 | 0 | 0 | 0 | . . . | 0 | 0 | 0 | (0) | 0 |
| . . . | . . . | . . . | . . . | . . . | . . . | . . . | . . . | . . . | . . . | . . . | . . . | . . . | . . . | . . . |
| 0 | 0 | 0 | 0 | 0 | 0 | 0 | 0 | 0 | . . . | 0 | 0 | 0 | 0 | 0 |

As shown in the table 6, if the normalization information idsf is maximized to 31, and the total quantization information idwl0 is maximized to 17. For example, if the normal-

TABLE 7

| | 0 | 1 | 2 | 3 | 4 | 5 | 6 | 7 | ... | N/2 − 5 | N/2 − 4 | N/2 − 3 | N/2 − 2 | N/2 − 1 |
|---|---|---|---|---|---|---|---|---|---|---|---|---|---|---|
| idsf | 31 | 29 | 27 | 26 | 28 | 27 | 26 | 26 | ... | 17 | 15 | 16 | 13 | 14 |
| Wn | 4 | 4 | 3 | 3 | 2 | 2 | 1 | 1 | ... | 0 | 0 | 0 | 0 | 0 |
| idsf1 | 35 | 33 | 30 | 29 | 30 | 29 | 27 | 27 | ... | 17 | 15 | 16 | 13 | 14 |

In the example of the table 7, a value of 4 to 1 is added to normalization information idsf for a low-frequency range while nothing is added to normalization information idsf for a high-frequency range. By thus adding the weighting coefficient Wn[i] to the normalization information idsf, bits can be concentrated on the low-frequency range, to improve tone quality in the range which is important for human auditory sense.

If the weighting coefficient Wn[i] is added as shown in the table 7, the maximum value of the normalization information idsf is 35. Therefore, if the table 6 is extended simply in a direction in which the normalization information idsf is increased by four as the maximum added number of the normalization information idsf, for example, the table 8 below is obtained. Numbers circled by broken lines in the table 8 each represent total quantization information idwl0 for every spectrum in case where no weighting is executed. Other numbers circled by continuous lines represent total quantization information idwl0 for every spectrum in case where weighting is executed.

quency spectrum mdspec1. The code string coding section 20 codes the weighting coefficient Wn[i] and includes the coded result in a code string.

Thus, according to the audio coding device 40 and audio decoding device 50 in the present embodiment, the quantization information idwl1 and quantization information idwl2 are determined uniquely based on the normalization information idsf. Based on the normalization information idsf and quantization information idwl1, the normalization coefficient sf2(idsf,dw11) is calculated. Therefore, the normalization information idsf has to be included as side information other than frequency spectrum information in a code string. Further, excessive bits generated by reducing the side information are used for coding the quantized frequency spectrum qspec1 and the differential quantized frequency spectrum qspec2. In this manner, coding efficiency of the quantized frequency spectrum qspec1 and differential quantized frequency spectrum qspec2 can be improved.

TABLE 8

| | 0 | 1 | 2 | 3 | 4 | 5 | 6 | 7 | ... | N/2 − 5 | N/2 − 4 | N/2 − 3 | N/2 − 2 | N/2 − 1 |
|---|---|---|---|---|---|---|---|---|---|---|---|---|---|---|
| 35 | 21 | 21 | 21 | 21 | 21 | 21 | 21 | 21 | ... | 21 | 21 | 21 | 21 | 21 |
| 34 | 20 | 20 | 20 | 20 | 20 | 20 | 20 | 20 | ... | 20 | 20 | 20 | 20 | 20 |
| 33 | 19 | 19 | 19 | 19 | 19 | 19 | 19 | 19 | ... | 19 | 19 | 19 | 19 | 19 |
| 32 | 18 | 18 | 18 | 18 | 18 | 18 | 18 | 18 | ... | 18 | 18 | 18 | 18 | 18 |
| 31 | 17 | 17 | 17 | 17 | 17 | 17 | 17 | 17 | ... | 17 | 17 | 17 | 17 | 17 |
| 30 | 16 | 16 | 16 | 16 | 16 | 16 | 16 | 16 | ... | 16 | 16 | 16 | 16 | 16 |
| 29 | 15 | 15 | 15 | 15 | 15 | 15 | 15 | 15 | ... | 15 | 15 | 15 | 15 | 15 |
| 28 | 14 | 14 | 14 | 14 | 14 | 14 | 14 | 14 | ... | 14 | 14 | 14 | 14 | 14 |
| 27 | 13 | 13 | 13 | 13 | 13 | 13 | 13 | 13 | ... | 13 | 13 | 13 | 13 | 13 |
| 26 | 12 | 12 | 12 | 12 | 12 | 12 | 12 | 12 | ... | 12 | 12 | 12 | 12 | 12 |
| ... | ... | ... | ... | ... | ... | ... | ... | ... | ... | ... | ... | ... | ... | ... |
| 18 | 4 | 4 | 4 | 4 | 4 | 4 | 4 | 4 | ... | 4 | 4 | 4 | 4 | 4 |
| 17 | 3 | 3 | 3 | 3 | 3 | 3 | 3 | 3 | ... | 3 | 3 | 3 | 3 | 3 |
| 16 | 2 | 2 | 2 | 2 | 2 | 2 | 2 | 2 | ... | 2 | 2 | 2 | 2 | 2 |
| 15 | 1 | 1 | 1 | 1 | 1 | 1 | 1 | 1 | ... | 1 | 1 | 1 | 1 | 1 |
| 14 | 0 | 0 | 0 | 0 | 0 | 0 | 0 | 0 | ... | 0 | 0 | 0 | 0 | 0 |
| 13 | 0 | 0 | 0 | 0 | 0 | 0 | 0 | 0 | ... | 0 | 0 | 0 | 0 | 0 |
| ... | ... | ... | ... | ... | ... | ... | ... | ... | ... | ... | ... | ... | ... | ... |
| 0 | 0 | 0 | 0 | 0 | 0 | 0 | 0 | 0 | ... | 0 | 0 | 0 | 0 | 0 |

In the example of this table 8, quantization accuracy in the low-frequency range improves. However, the maximum quantization information increases thereby to increase the total number of used bits. Therefore, bit adjustment should preferably be performed such that the total number of used bits falls below the total number of usable bits, in actual.

A fixed coefficient may be used as the weighting coefficient Wn[i] described above both in the coding side and decoding side. Alternatively, an optimal weighting coefficient Wn[i] may be generated based on characteristics of an audio source (frequency energy, transit characteristic, gain, masking characteristic, etc.) in the coding side. In the latter case, the quantization information calculation section 41 generates the weighting coefficient Wn[i], for example, based on the fre-

[Third Embodiment]

Figure 11:
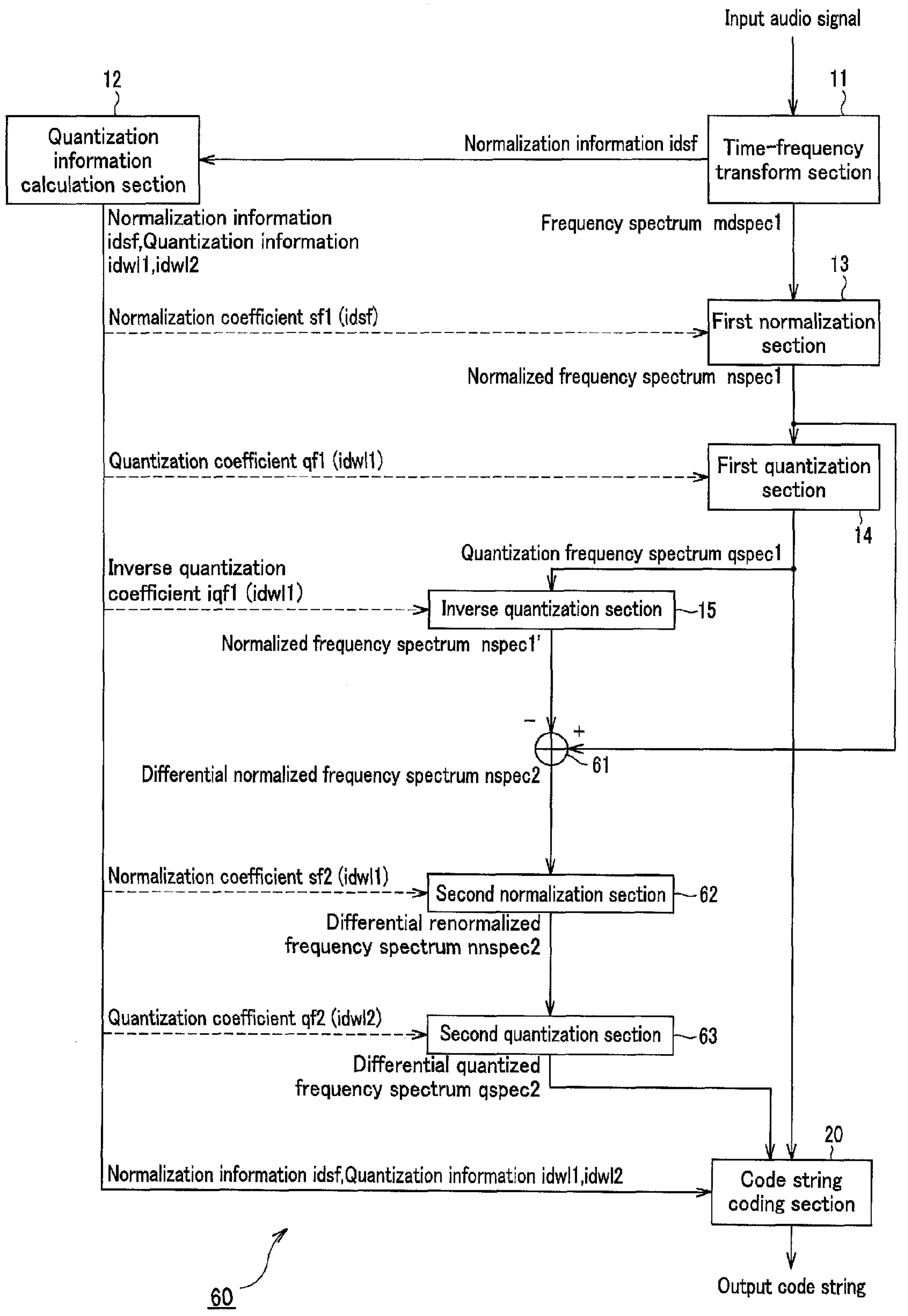
FIG. 11 is a diagram showing schematic structure of an audio coding device according to the third embodiment.

An audio coding device 60 shown in FIG. 11 according to the third embodiment has the same basic structure as that of the audio coding device 10 shown in FIG. 1. However, the audio coding device 60 has a feature that normalization/quantization in the second stage is not performed on the difference between a frequency spectrum mdspec1 and a frequency spectrum mdspec 1' but is performed on the difference between a normalized frequency spectrum nspec 1 and a normalized frequency spectrum nspec1'. Therefore, the same structural features as those of the audio coding device 10 previously shown in FIG. 1 are denoted at the same reference symbols, and detailed descriptions thereof will be omitted herefrom.

In this audio coding device 60, the subtraction section 61 subtracts the normalized frequency spectrum nspec1' from the normalized frequency spectrum nspec1, as expressed by the following equation (18):

$$n\text{spec}2 = n\text{spec}1 - n\text{spec}1' \quad (18)$$

The subtraction section 61 supplies a second normalization section 62 with an obtained differential normalized frequency spectrum nspec2.

The second normalization section 62 normalizes the differential normalized frequency spectrum nspec2 by use of a normalization coefficient sf2, as expressed by the following equation (19):

$$nn\text{spec}2 = n\text{spec}2 \cdot \times \cdot sf2 = (n\text{spec}1 - n\text{spec}1') \cdot \times \cdot sf2 \quad (19)$$

The second normalization section 62 supplies a second quantization section 63 with an obtained differential renormalized frequency spectrum nnspec2.

The normalized frequency spectrum nspec1 is normalized to a range of ±f ∈ R by a normalization coefficient sf1(idsf) corresponding to the normalization information idsf. Therefore, in case of performing linear quantization by which the quantization step width nstep(idwl1) is uniquely determined in correspondence with the quantization information idwl1, for example as shown in FIG. 3, the difference between the normalized frequency spectrums nspec1 and nspec1' before and after the quantization falls within a range of ±f/nstep (idwl1) as a maximum quantization error. Accordingly, a normalization coefficient sf2 can be calculated as expressed below by the equation (20):

$$sf2(idwl1) = n\text{step}(idwl1)/f \quad (20)$$

That is, the normalization coefficient sf2(idwl1) can be calculated based on the quantization information idwl1.

The second quantization section 63 quantizes the differential renormalized frequency spectrum nnspec2 by use of a quantization coefficient qf2(idwl2) corresponding to the quantization information idwl2. The second quantization section 63 supplies the code string coding section 20 with an obtained differential quantized frequency spectrum qspec2. For example, in case of performing linear quantization as shown in FIG. 3, a differential quantized frequency spectrum qspec2 can be obtained as expressed below by the following equation (21):

$$q\text{spec}2 = (\text{int})(\text{floor}(nn\text{spec}2 \cdot \times \cdot qf2(idwl2)) + 0.5) \quad (21)$$

The code string coding section 20 codes the quantized frequency spectrum qspec1, differential quantized frequency spectrum qspec2, normalization information idsf, quantization information idwl1, and quantization information idwl2. The code string coding section 20 outputs an obtained code string.

Figure 12:
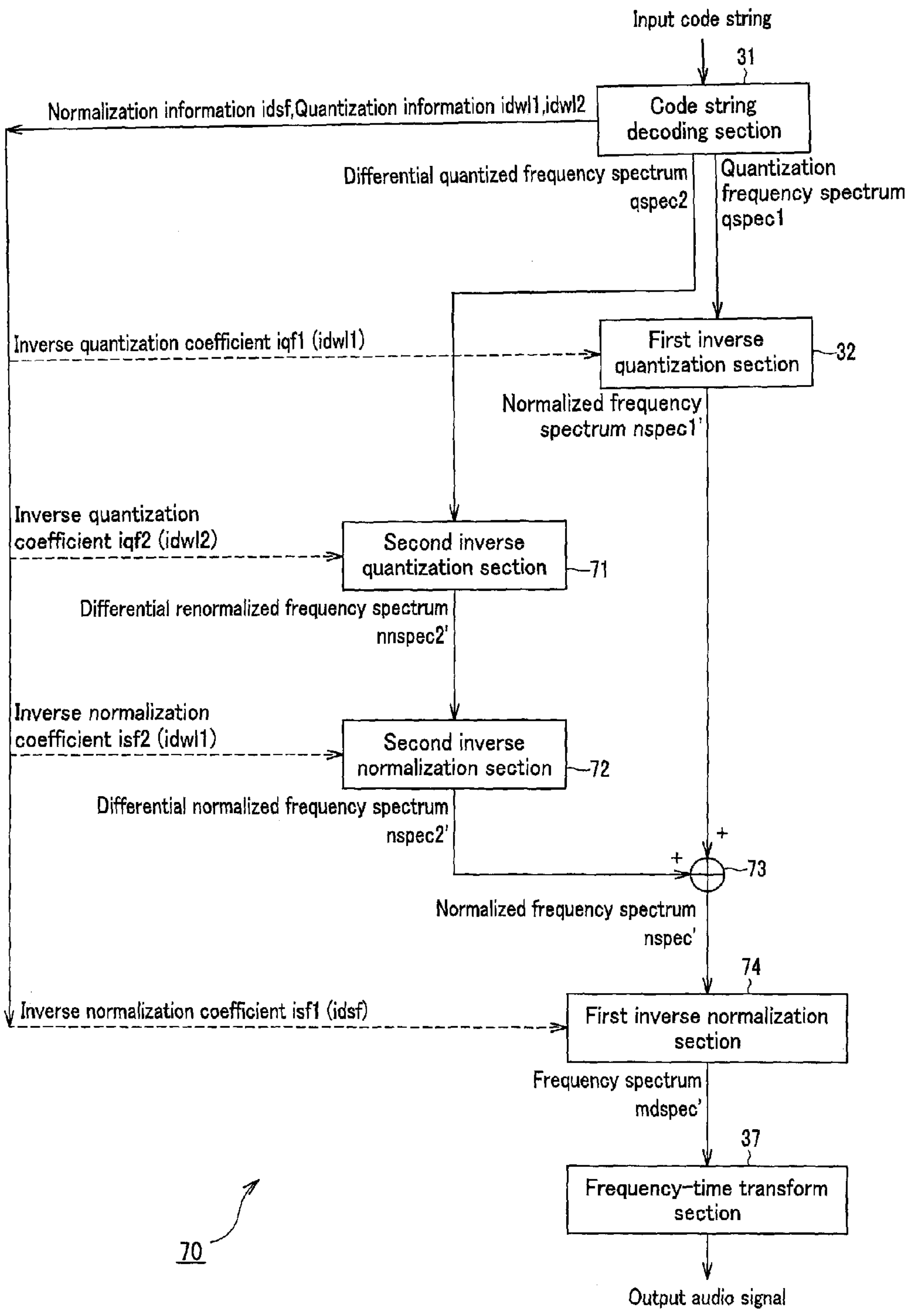
FIG. 12 is a diagram showing schematic structure of an audio decoding device corresponding to the audio coding device shown in FIG. 11.

Next, schematic structure of an audio decoding device corresponding to the audio coding device 60 is shown in FIG. 12. The audio decoding device 70 shown in FIG. 12 has the same basic structure as that of the audio decoding device 30 shown in FIG. 7. Therefore, the same structural features as those of the audio decoding device 30 are denoted at the same reference symbols, and detailed descriptions thereof will be omitted.

In the audio decoding device 70, a second inverse quantization section 71 inversely quantizes the differential quantized frequency spectrum qspec2 by use of an inverse quantization coefficient iqf2(idwl2) corresponding to the quantization information idwl2, as expressed by the following equation (22):

$$nn\text{spec}2' = q\text{spec}2 \cdot \times \cdot iqf2(idwl2) \quad (22)$$

The second inverse quantization section 71 supplies a second inverse normalization section 72 with an obtained differential renormalized frequency spectrum nnspec2'.

The second inverse normalization section 72 inversely normalizes the differential renormalized frequency spectrum nnspec2' by use of an inverse normalization coefficient isf2 (idwl1) corresponding to the quantization information idwl1, as expressed by the following equation (23):

$$n\text{spec}2' = nn\text{spec}2' \cdot \times \cdot isf2(idwl1) \quad (23)$$

The second inverse normalization section 72 supplies an addition section 73 with an obtained differential normalized frequency spectrum nspec2'. The relationship between the inverse normalization coefficient isf2(idwl1) and the quantization information idwl1 is expressed by the following equation (24):

$$isf2(idwl1) = 1/sf2(idwl1) = f/n\text{step}(idwl1) \quad (24)$$

The addition section 73 adds up the normalized frequency spectrum nspec1' and the differential normalized frequency spectrum nspec2', as expressed by the following equation (25):

$$n\text{spec}' = n\text{spec}1' + n\text{spec}2' \quad (25)$$

The addition section 73 supplies a first inverse normalization section 74 with an obtained normalized frequency spectrum nspec'.

The first inverse normalization section 74 inversely quantizes the normalized frequency spectrum nspec' by use of an inverse normalization coefficient isf1(idsf) corresponding to the normalization information idsf, as expressed by the following equation (26):

$$md\text{spec}' = n\text{spec}' \cdot \times \cdot isf1(idsf) \quad (26)$$

The first inverse normalization section 74 supplies the frequency-time transform section 37 with an obtained frequency spectrum mdspec'.

The frequency-time transform section 37 performs frequency-time transform on the frequency spectrum mdspec' to generate an audio signal. The frequency-time transform section 37 outputs this audio signal.

[Fourth Embodiment]

In the first to third embodiments described above, three kinds of basic structures of audio coding devices and audio decoding devices have been described. In the present embodiment, however, modifications of the audio coding devices and the audio decoding devices will be described. The same structures as those of the audio coding device 10 and the audio decoding device 30 are denoted at the same reference symbols, and detailed descriptions thereof will be omitted.

Figure 13:
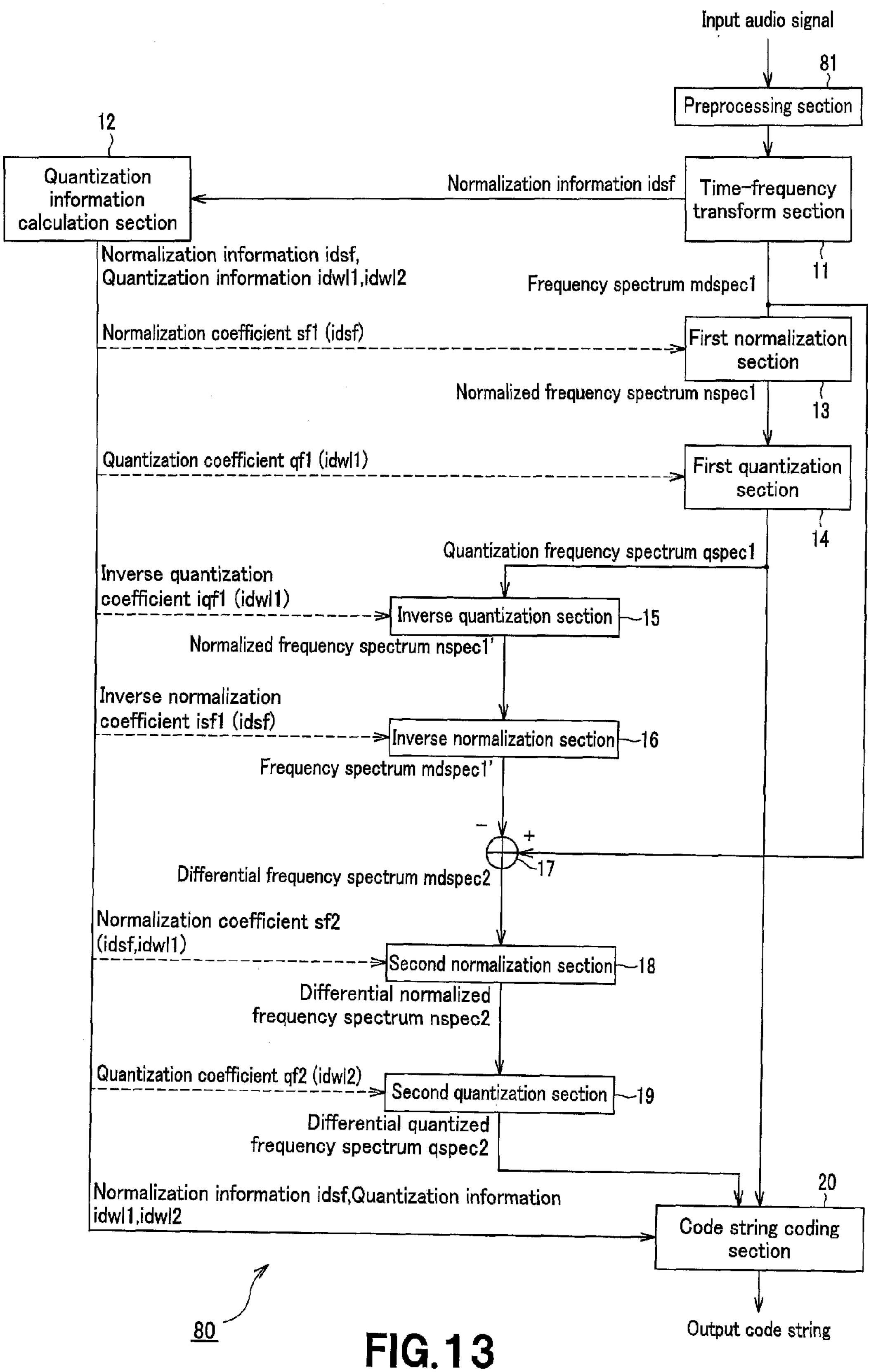
FIG. 13 is a diagram showing schematic structure of an audio coding device according to the fourth embodiment.
Figure 14:
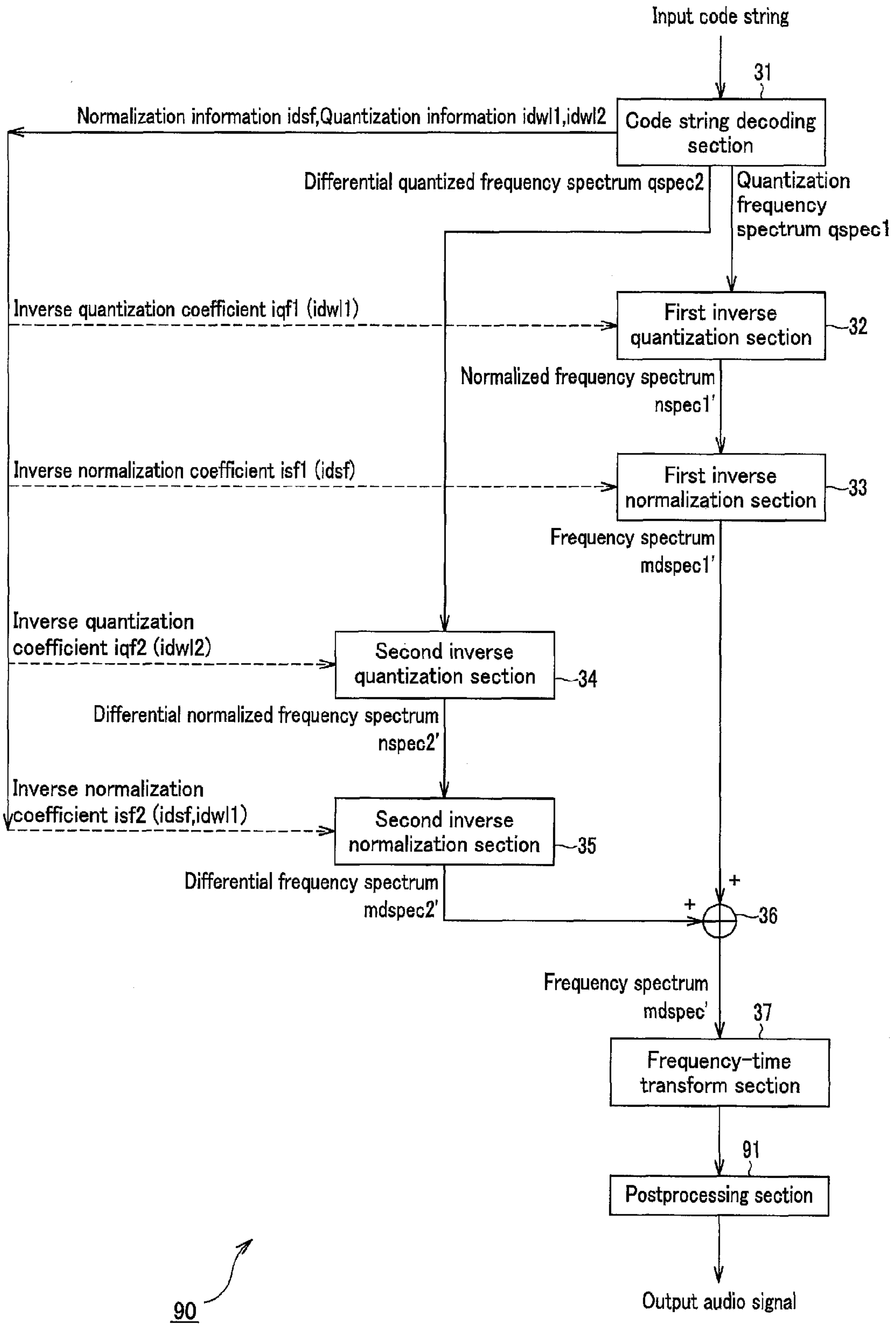
FIG. 14 is a diagram showing schematic structure of an audio decoding device corresponding to the audio coding device shown in FIG. 13.

At first, FIG. 13 shows schematic structure of an audio coding device 80 according to a first modification. FIG. 14 shows schematic structure of an audio decoding device 90 corresponding to the audio coding device 80. In the audio coding device 80, a preprocessing section 81 performs bandwidth division, gain adjustment, and the like on an input audio signal before performing time-frequency transform on the input audio signal. On the other side, in the audio decoding device 90, a postprocessing section 91 performs bandwidth synthesis, gain adjustment, and the like on an audio signal after performing the frequency-time transform on a frequency spectrum mdspec'.

Figure 15:
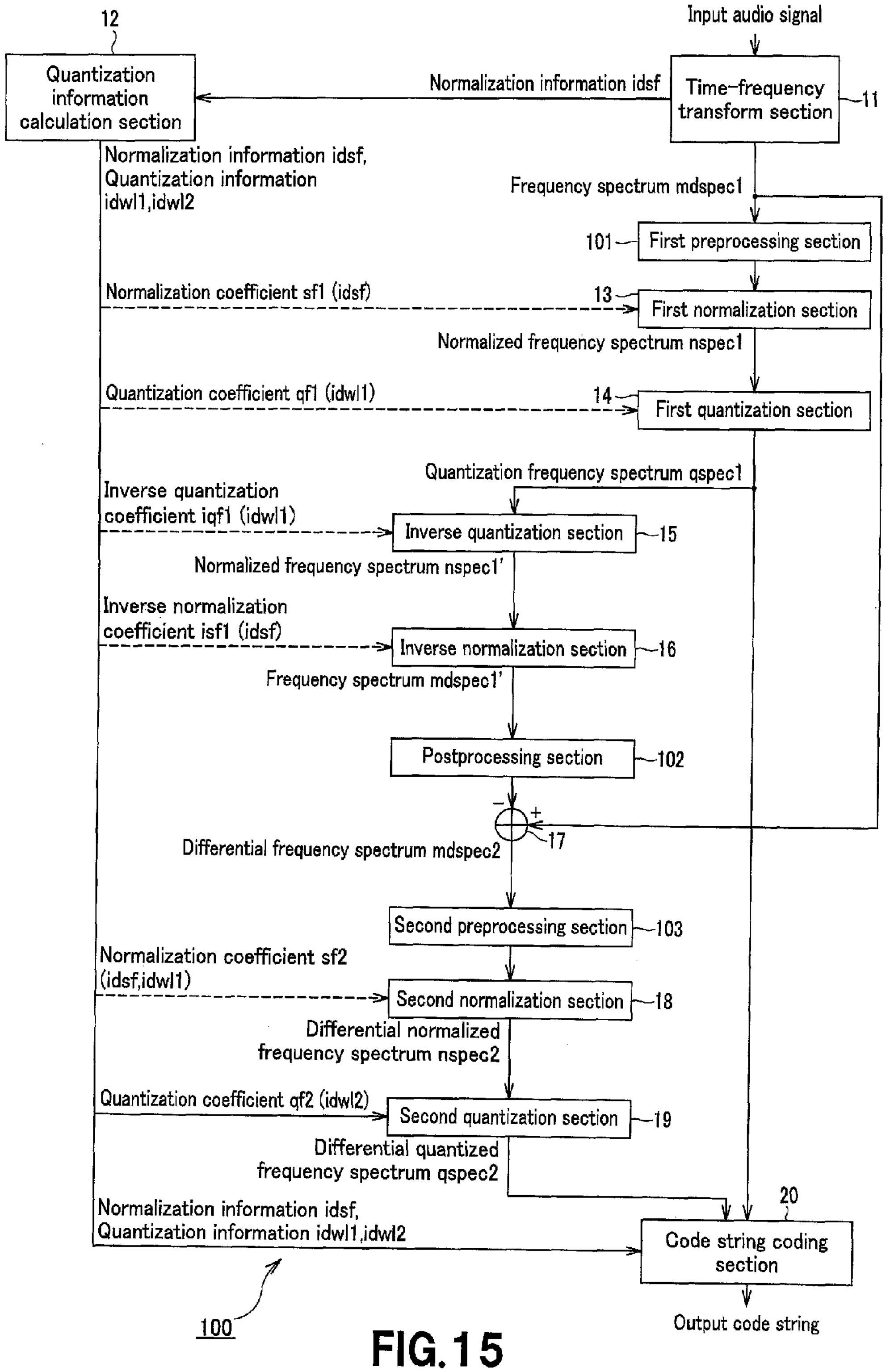
FIG. 15 is a diagram showing another example of schematic structure of an audio coding device according to the fourth embodiment.
Figure 16:
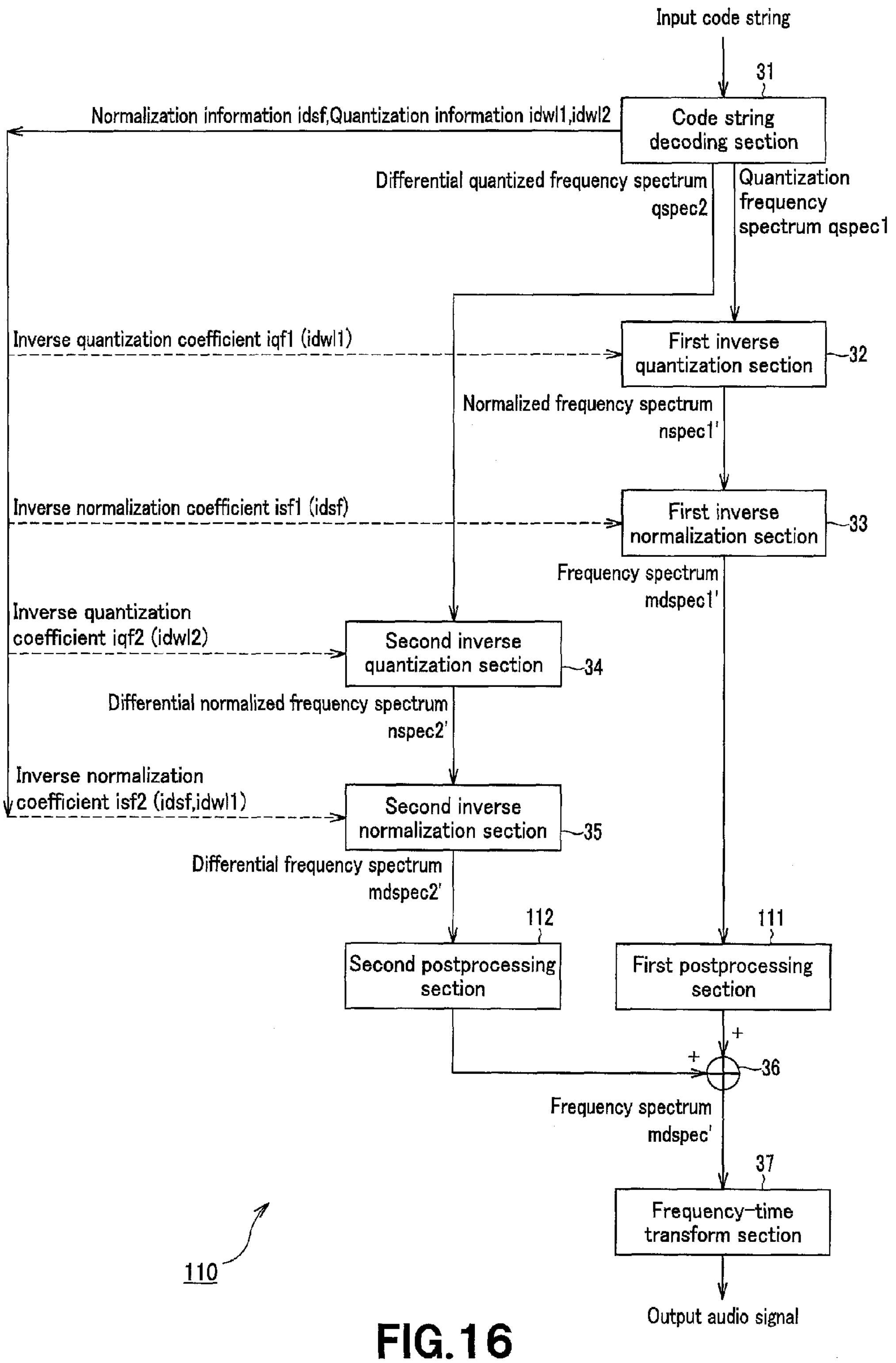
FIG. 16 is a diagram showing schematic structure of an audio decoding device corresponding to the audio coding device shown in FIG. 15.

Next, FIG. 15 shows schematic structure of an audio coding device 100 according to a second modification. FIG. 16 shows schematic structure of an audio decoding device 110 corresponding to the audio coding device 100. In this audio coding device 100, a first preprocessing section 101 performs preprocessing such as non-linear transform corresponding to a frequency spectrum distribution, on a frequency spectrum mdspec1. A post processing section 102 performs postprocessing such as non-linear inverse transform corresponding to a frequency spectrum distribution, on a frequency spectrum mdspec1'. A second preprocessing section 103 performs preprocessing such as non-linear transform corresponding to a frequency spectrum distribution, on a differential frequency spectrum mdspec2. On the other side, in the audio decoding device 110, a first postprocessing section 111 performs postprocessing such as non-linear inverse transform corresponding to the coding side, on the frequency spectrum mdspec1'. A second postprocessing section 112 performs postprocessing such as non-linear inverse transform corresponding to the coding side, on a differential frequency spectrum mdspec2'.

The foregoing first to third embodiments have been described on the assumption that the first quantization section 14 performs linear quantization. However, non-linear quantization is equivalent to linear quantization performed after non-linear transform. Therefore, if the first preprocessing section 101 to perform non-linear transform is provided in the front stage of the first quantization section 14, these embodiments are applicable to a case of executing non-linear quantization, as shown in FIG. 15.

Figure 17:
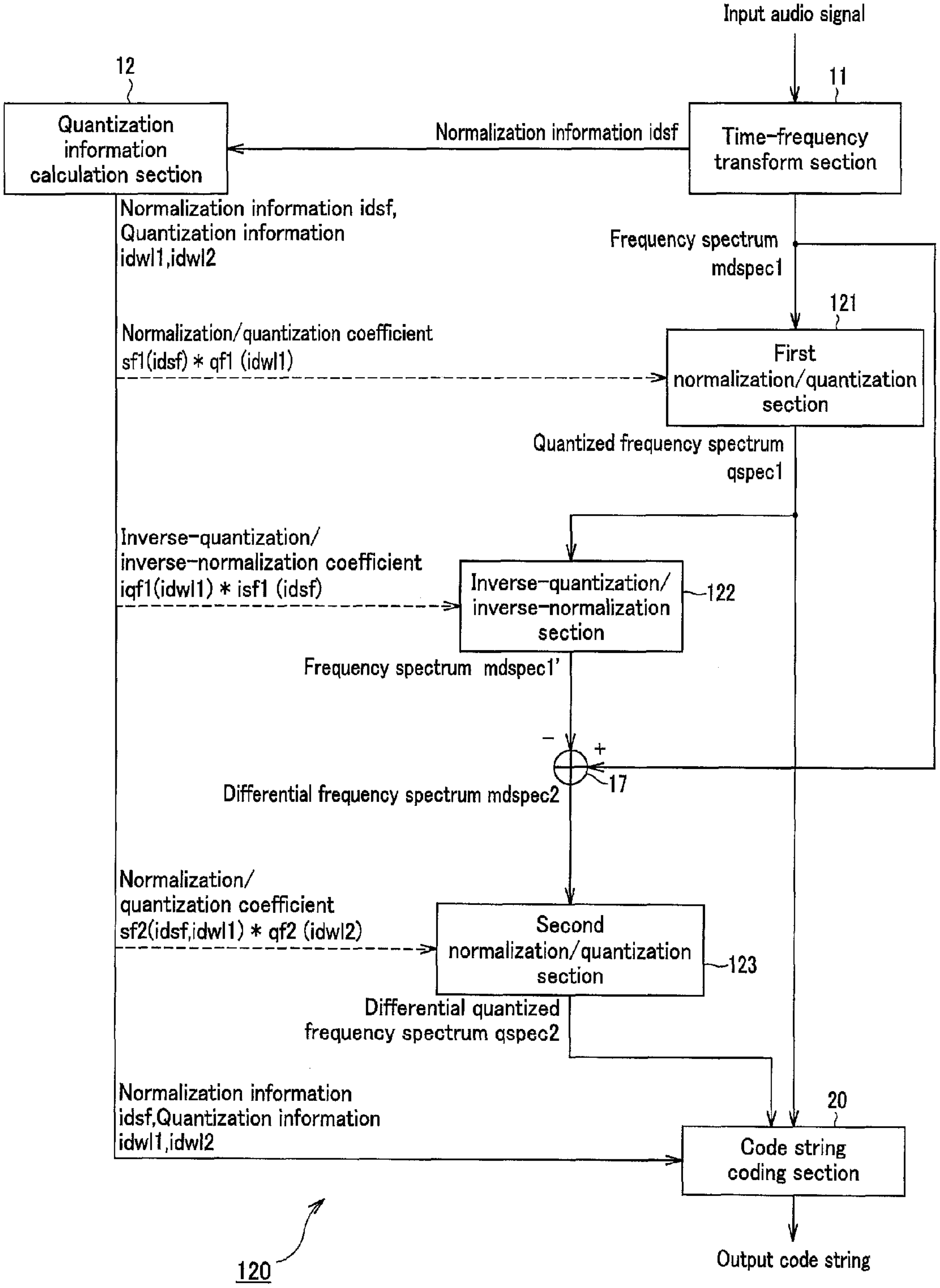
FIG. 17 is a diagram showing further another example of schematic structure of an audio coding device according to the fourth embodiment.
Figure 18:
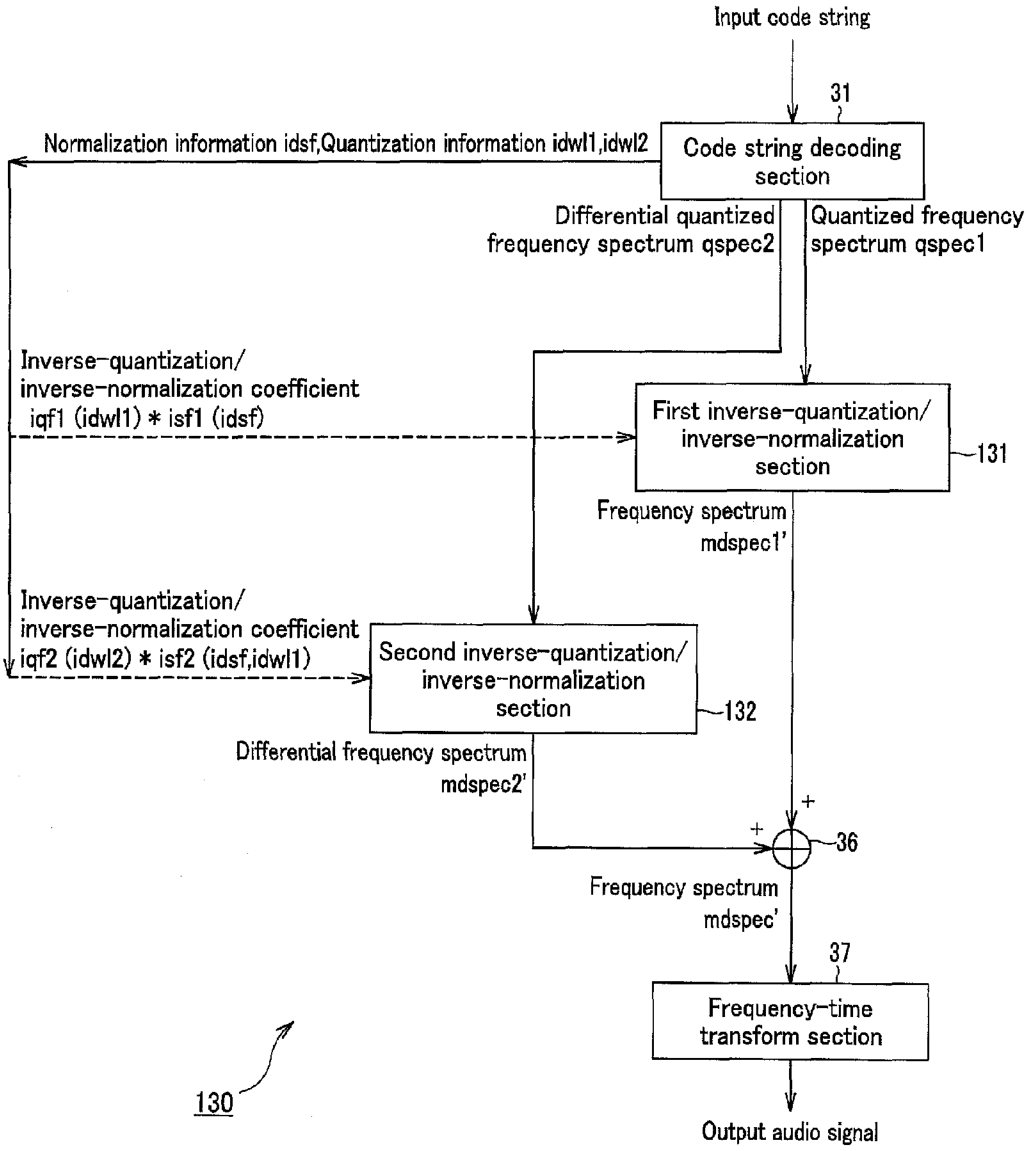
FIG. 18 is a diagram showing schematic structure of an audio decoding device corresponding to the audio coding device shown in FIG. 17.

Next, FIG. 17 shows schematic structure of an audio coding device 120 according to a third modification. FIG. 18 shows schematic structure of an audio decoding device 130 corresponding to the audio coding device 120. In this audio coding device 120, a first normalization/quantization section 121 normalizes/quantizes a frequency spectrum mdspec1 by use of a normalization/quantization coefficient sf1(idsf)·×·qf1(idwl1). An inverse-quantization/inverse-normalization section 122 inversely normalizes/quantizes a quantized frequency spectrum qspec1 by use of an inverse-normalization/inverse-quantization coefficient iqf1(idwl1)·×·isf1(idsf). A second normalization/quantization section 123 normalizes/quantizes a differential frequency spectrum mdspec2 by use of a normalization/quantization coefficient sf2(idsf, idwl1)·×·qf2(idwl2). On the other side, in the audio decoding device 130, a first inverse-quantization/inverse-normalization section 131 inversely quantizes/normalizes a quantized frequency spectrum qspec1 by use of an inverse-quantization/inverse-normalization coefficient iqf1(idwl1)·×·isf1(idsf). A second inverse-quantization/inverse-normalization section 132 inversely quantizes/normalizes a differential quantized frequency spectrum qspec2 by use of an inverse-quantization/inverse-normalization coefficient iqf2(idwl2)·×·isf2(idsf, idwl1). By thus multiplying the normalization coefficient and the quantization coefficient by each other in advance, the normalization processing and the quantization processing can be put together into one processing. Further, by thus multiplying the inverse quantization coefficient and the inverse normalization coefficient by each other in advance, the inverse quantization processing and the inverse normalization processing can be put together into one processing. Accordingly, the calculation amount and processing amount can be reduced.

This modification has been described as a modification to the audio coding device 10 and the audio decoding device 30 in the first embodiment. However, the same modification may be made to the audio coding device 40 and the audio decoding device 50 in the second embodiment as well as the audio coding device 60 and the audio decoding device 70 in the third embodiment.

Although best modes for carrying out the present invention have thus been described above, the present invention is not limited to the embodiments as described above but various changes can be made without deviating from the subject matter of the invention.

For example, the above embodiments have been described such that coding is achieved by performing two-stage normalization/quantization on a frequency spectrum obtained by subjecting an input audio signal to time-frequency transform. The present invention is not limited to these embodiments but can be extended such that coding is achieved by performing normalization/quantization through an arbitrary number of stages. In this case, quantization information idwlk in the k-th stage (k is an integer not smaller than 1) is limited by a limiter link. If this limit is exceeded, the excess is allocated for quantization information idwl(k+1) for the (k+1)-th stage.

Although the above embodiments each have been described as hardware structure, the present invention is not limited to hardware structure. Arbitrary processing can be realized by letting a CPU (Central Processing Unit) execute a computer program. In this case, the computer program may be provided, recorded on a recording medium or transferred by a transfer medium such as the Internet, etc.

It should be understood by those skilled in the art that various modifications, combinations, sub-combinations and alterations may occur depending on design requirements and other factors insofar as they are within the scope of the appended claims or the equivalents thereof.

What is claimed is:

1. An audio coding device including processing circuitry and programmed to execute a program via the processing circuitry, the program comprising:

a time frequency transformation unit configured to perform time-frequency transform on an input audio signal to generate a frequency spectrum;

a quantization unit configured to (a) generate total quantization information indicating a quantization bit number on the basis of predetermined normalization information, (b) allocate the total quantization information, by setting a predetermined limit to a first quantization information, allocating, up to the predetermined limit, the total quantization information to the first quantization information, and allocating an excess beyond the predetermined limit to the second quantization information, and (c) in each of a plurality of stages, (i) generate the first quantization information and the second quantization information, each indicating a respective quantization bit number, and (ii) normalize the frequency spectrum for every frequency component by use of a first normalization coefficient corresponding to the normalization information to generate a normalized frequency spectrum, each stage having a predetermined limit to quantization information, and if quantization information allocated for a k-th stage, 'k' being an integer greater than zero, exceeds a limit in the k-th stage, an excess for quantization information is allocated to a (k+1)-th stage, the limit being based on a predetermined allowed quantization bit number for each of the respective plurality of stages;

a first quantization unit configured to linearly quantize the normalized frequency spectrum by use of a first quantization coefficient corresponding to the first quantization information, to generate a quantized frequency spectrum;

a subtraction unit configured to subtract from the frequency spectrum, a frequency spectrum obtained by inversely quantizing and inversely normalizing the quantized frequency spectrum, to generate a differential frequency spectrum;

a normalization unit configured to normalize the differential frequency spectrum by use of a second normalization coefficient corresponding to the normalization information and the first quantization information, to generate a differential normalized frequency spectrum;

a second normalization unit configured to linearly quantize the differential normalized frequency spectrum by use of a second quantization coefficient corresponding to the second quantization information, to generate a differential quantized frequency spectrum; and a code unit configured to code the normalization information, the first quantization information, the second quantization information, the quantized frequency spectrum, and the differential quantized frequency spectrum, to output a code string.

2. The audio coding device of claim 1, wherein the program further comprises a non-linear transformation unit configured to:

perform non-linear transform on the frequency spectrum or the normalized frequency spectrum; and perform non-linear inverse transform on a normalized frequency spectrum obtained by inversely quantizing the quantized frequency spectrum, or a frequency spectrum obtained by inversely normalizing the normalized frequency spectrum.

3. A method executed by an audio coding device comprising the steps of:

a time-frequency transform step of performing time-frequency transform on an input audio signal to generate a frequency spectrum;

a quantization information calculation step including the steps of (a) generating total quantization information indicating a quantization bit number on the basis of predetermined normalization information, (b) allocating the total quantization information by setting a predetermined limit to a first quantization information, (c) allocating, up to the predetermined limit, the total quantization information to the first quantization information, (d) allocating an excess beyond the predetermined limit to the second quantization information, and, (e) in each of a plurality of stages, generating the first quantization information and the second quantization information, each indicating a respective quantization bit number;

a first normalization step of normalizing the frequency spectrum for every frequency component by use of a first normalization coefficient corresponding to the normalization information, to generate a normalized frequency spectrum, wherein, a predetermined limit to quantization information is set in each stage, and if quantization information allocated for a k-th stage, 'k' being an integer greater than zero, exceeds a limit in the k-th stage, an excess for quantization information is allocated for a (k+1)-th stage, the limit being based on a predetermined allowed quantization bit number for each of the respective plurality of stages;

a first quantization step of linearly quantizing the normalized frequency spectrum by use of a first quantization coefficient corresponding to the first quantization information, to generate a quantized frequency spectrum;

a subtraction step of subtracting, from the frequency spectrum, a frequency spectrum obtained by inversely quantizing and inversely normalizing the quantized frequency spectrum, to generate a differential frequency spectrum;

a second normalization step of normalizing the differential frequency spectrum by use of a second normalization coefficient corresponding to the normalization information and the first quantization information, to generate a differential normalized frequency spectrum;

a second quantization step of linearly quantizing the differential normalized frequency spectrum by use of a second quantization coefficient corresponding to the second quantization information, to generate a differential quantized frequency spectrum; and a code string coding step of coding the normalization information, the first quantization information, the second quantization information, the quantized frequency spectrum, and the differential quantized frequency spectrum, to output a code string.

4. An audio coding device including processing circuitry and programmed to execute a program via the processing circuitry, the program comprising:

a time frequency transformation unit configured to perform time-frequency transform on an input audio signal, to generate a frequency spectrum;

a quantization unit configured to (a) generate total quantization information indicating a quantization bit number on the basis of predetermined normalization information, (b) allocate the total quantization information, by setting a predetermined limit to a first quantization information, allocating, up to the predetermined limit, the total quantization information to the first quantization information, and allocating an excess beyond the predetermined limit to the second quantization information and (c) in each of a plurality of stages, (i) generate the first quantization information and the second quantization information, each indicating a respective quantization bit number, and (ii) normalize the frequency spectrum for every frequency component by use of a first normalization coefficient corresponding to the normalization information to generate a normalized frequency spectrum, each stage having a predetermined limit to quantization information, and if quantization information allocated for a k-th stage, 'k' being an integer greater than zero, exceeds a limit in the k-th stage, an excess for quantization information is allocated to a (k+1)-th stage, the limit being based on a predetermined allowed quantization bit number for each of the respective plurality of stages;

a first quantization unit configured to linearly quantize the normalized frequency spectrum by use of a first quantization coefficient corresponding to the first quantization information, to generate a quantized frequency spectrum;

subtraction unit configured to subtract from the frequency spectrum, a frequency spectrum obtained by inversely quantizing and inversely normalizing the quantized frequency spectrum, to generate a differential frequency spectrum;

a normalization unit configured to normalize the differential frequency spectrum by use of a second normalization coefficient corresponding to the normalization information and the first quantization information, to generate a differential normalized frequency spectrum;

a second quantization unit configured to linearly quantize the differential normalized frequency spectrum by use of a second quantization coefficient corresponding to the second quantization information, to generate a differential quantized frequency spectrum; and a code unit configured to code string the normalization information, the quantized frequency spectrum, and the differential quantized frequency spectrum, to output a code string.

5. The device according to claim 4, wherein:

a maximum quantization error, corresponding to the first quantization information, is uniquely determined and the second normalization coefficient is determined by the product of the first normalization coefficient and the reciprocal of the maximum quantization error.

6. The device according to claim 4, wherein the quantization bit number indicated by the total quantization information increases or decreases one by one as the normalization information is increased or decreased one by one.

7. The device according to claim 4, wherein the audio coding device is further configured to:

perform non-linear transform on the frequency spectrum or the normalized frequency spectrum; and perform non-linear inverse transform on a normalized frequency spectrum obtained by inversely quantizing the quantized frequency spectrum, or a frequency spectrum obtained by inversely normalizing the normalized frequency spectrum.

8. A method executed by an audio coding device comprising the steps of:

a time-frequency transform step of performing time-frequency transform on an input audio signal to generate a frequency spectrum;

a quantization information calculation step including the steps of (a) generating total quantization information indicating a quantization bit number on the basis of predetermined normalization information, (b) allocating the total quantization information by setting a predetermined limit to a first quantization information, (c) allocating, up to the predetermined limit, the total quantization information to the first quantization information, and (d) in each of a plurality of stages, allocating an excess beyond the predetermined limit to the second quantization information to generate, the first quantization information and the second quantization information each indicating a respective quantization bit number;

a first normalization step of normalizing the frequency spectrum for every frequency component by use of a first normalization coefficient corresponding to the normalization information, to generate a normalized frequency spectrum, wherein, a predetermined limit to quantization information is set in each stage, and if quantization information allocated for a k-th stage, 'k' being an integer greater than zero, exceeds a limit in the k-th stage, an excess for quantization information is allocated for a (k+1)-th stage, the limit being based on a predetermined allowed quantization bit number for each of the respective plurality of stages;

a first quantization step of linearly quantizing the normalized frequency spectrum by use of a first quantization coefficient corresponding to the first quantization information, to generate a quantized frequency spectrum;

a subtraction step of subtracting, from the frequency spectrum, a frequency spectrum obtained by inversely quantizing and inversely normalizing the quantized frequency spectrum, to generate a differential frequency spectrum;

a second normalization step of normalizing the differential frequency spectrum by use of a second normalization coefficient corresponding to the normalization information and the first quantization information, to generate a differential normalized frequency spectrum;

a second quantization step of linearly quantizing the differential normalized frequency spectrum by use of a second quantization coefficient corresponding to the second quantization information, to generate a differential quantized frequency spectrum; and a code string coding step of coding the normalization information, the quantized frequency spectrum, and the differential quantized frequency spectrum, to output a code string.

9. An apparatus including an audio coding device with processing circuitry and programmed to execute a program via the processing circuitry, the program comprising:

a time frequency transformation unit configured to perform time-frequency transform on an input audio signal to generate a frequency spectrum;

a quantization unit configured to (a) generate total quantization information indicating a quantization bit number on the basis of predetermined normalization information (b) allocate the total quantization information, by setting a predetermined limit to a first quantization information, allocating, up to the predetermined limit, the total quantization information to the first quantization information, and allocating an excess beyond the predetermined limit to the second quantization information (c) in each of a plurality of stages, (i) generate the first quantization information and the second quantization information, each indicating a respective quantization bit number, and (ii) normalize the frequency spectrum for every frequency component by use of a first normalization coefficient corresponding to the normalization information, to generate a normalized frequency spectrum each stage having a predetermined limit to quantization information , and if quantization information allocated for a k-th stage, 'k' being an integer greater than zero, exceeds a limit in the k-th stage, an excess for quantization information is allocated to a (k+1)-th stage, the limit being based on a predetermined allowed quantization bit number for each of the respective plurality of stages;

a first quantization unit configured to linearly quantize the normalized frequency spectrum by use of a first quantization coefficient corresponding to the first quantization information, to generate a quantized frequency spectrum;

a subtraction unit configured to subtract from the normalized frequency spectrum, a normalized frequency spectrum obtained by inversely quantizing the quantized frequency spectrum, to generate a differential normalized frequency spectrum;

a normalization unit configured to normalize the differential normalized frequency spectrum by use of a second normalization coefficient corresponding to the first quantization information, to generate a differential renormalized frequency spectrum;

a second quantization unit configured to linearly quantize the differential renormalized frequency spectrum by use of a second quantization coefficient corresponding to the second quantization information, to generate a differential quantized frequency spectrum; and a code unit configured to code the normalization information, the first quantization information, the second quantization information, the quantized frequency spectrum, and the differential quantized frequency spectrum, to output a code string.

10. The apparatus according to claim 9, wherein the audio coding device is further configured to:

perform non-linear transform on the frequency spectrum or the normalized frequency spectrum; and perform non-linear inverse transform on a normalized frequency spectrum obtained by inversely quantizing the quantized frequency spectrum, or a frequency spectrum obtained by inversely normalizing the normalized frequency spectrum.

11. A method executed by an audio coding device comprising the steps of:

a time-frequency transform step of performing time-frequency transform on an input audio signal to generate a frequency spectrum;

a quantization information calculation step including the steps of (a) generating total quantization information indicating a quantization bit number on the basis of predetermined normalization information, (b) allocating the total quantization information by setting a predetermined limit to a first quantization information, (c) allocating, up to the predetermined limit, the total quantization information to the first quantization information, and (d) in each of a plurality of stages, allocating an excess beyond the predetermined limit to the second quantization information, and generating the first quantization information and the second quantization information, each indicating a respective quantization bit number;

a first normalization step of normalizing the frequency spectrum for every frequency component by use of a first normalization coefficient corresponding to the normalization information, to generate a normalized frequency spectrum, wherein, a predetermined limit to quantization information is set in each stage, and if quantization information allocated for a k-th stage, 'k' being an integer greater than zero, exceeds a limit in the k-th stage, an excess for quantization information is allocated for a (k+1)-th stage, the limit being based on a predetermined allowed quantization bit number for each of the respective plurality of stages;

a first quantization step of linearly quantizing the normalized frequency spectrum by use of a first quantization coefficient corresponding to the first quantization information, to generate a quantized frequency spectrum;

a subtraction step of subtracting, from the normalized frequency spectrum, a normalized frequency spectrum obtained by inversely quantizing the quantized frequency spectrum, to generate a differential normalized frequency spectrum;

a second normalization step of normalizing the differential normalized frequency spectrum by use of a second normalization coefficient corresponding to the first quantization information, to generate a differential renormalized frequency spectrum;

a second quantization step of linearly quantizing the differential renormalized frequency spectrum by use of a second quantization coefficient corresponding to the second quantization information, to generate a differential quantized frequency spectrum; and a code string coding step of coding the normalization information, the first quantization information, the second quantization information, the quantized frequency spectrum, and the differential quantized frequency spectrum, to output a code string.

12. An apparatus comprising an audio decoding device including processing circuitry and programmed to execute a program via the processing circuitry, the program comprising:

a time frequency transformation unit configured to decode an input code string, to generate normalization information, a quantized frequency spectrum, and a differential quantized frequency spectrum;

a quantization unit configured to (a) generate total quantization information indicating a quantization bit number on the basis of the normalization information (b) allocate the total quantization information, by setting a predetermined limit to a first quantization information, allocating, up to the predetermined limit, the total quantization information to the first quantization information, and allocating an excess beyond the predetermined limit to the second quantization information, and (c) in each of a plurality of stages, (i) generate the first quantization information and the second quantization information, each indicating a respective quantization bit number and linearly inversely quantize the quantized frequency spectrum by use of a first inverse quantization coefficient corresponding to the first quantization information and (ii) generate a normalized frequency spectrum, each stage having a predetermined limit to quantization information, and if quantization information allocated for a k-th stage, 'k' being an integer greater than zero, exceeds a limit in the k-th stage, an excess for quantization information is allocated to a (k+1)-th stage, the limit being based on a predetermined allowed quantization bit number for each of the respective plurality of stages;

a first normalization unit configured to inversely normalize the normalized frequency spectrum by use of a first inverse normalization coefficient corresponding to the normalization information, to generate a frequency spectrum;

a subtraction unit configured to linearly inversely quantize the differential quantized frequency spectrum by use of a second inverse quantization coefficient corresponding to the second quantization information, to generate a differential normalized frequency spectrum;

a second normalization unit configured to inversely normalize the differential normalized frequency spectrum by use of a second inverse normalization coefficient corresponding to the normalization information and the first quantization information, to generate a differential frequency spectrum;

an addition unit configured to add the frequency spectrum and the differential frequency spectrum; and a second time transformation unit configured to perform frequency-time transform on a frequency spectrum obtained by the addition means, to generate an output audio signal.

13. A method executed by an audio coding device comprising the steps of:

a code string decoding step of decoding an input code string, to generate normalization information, a quantized frequency spectrum, and a differential quantized frequency spectrum;

a quantization information calculation step including the steps of (a) generating total quantization information indicating a quantization bit number on the basis of the normalization information, (b) allocating the total quantization information, by setting a predetermined limit to a first quantization information, (c) allocating, up to the predetermined limit, the total quantization information to the first quantization information, and allocating an excess beyond the predetermined limit to the second quantization information (d) in each of a plurality of stages, generate the first quantization information and second quantization information each indicating a quantization bit number;

a first inverse quantization step of linearly inversely quantizing the quantized frequency spectrum by use of a first inverse quantization coefficient corresponding to the first quantization information, to generate a normalized frequency spectrum, wherein, a predetermined limit to quantization information is set in each stage, and if quantization information allocated for a k-th stage, 'k' being an integer greater than zero, exceeds a limit in the k-th stage, an excess for quantization information is allocated for a (k+1)-th stage, the limit being based on a predetermined allowed quantization bit number for each of the respective plurality of stages;

a first inverse normalization step of inversely normalizing the normalized frequency spectrum by use of a first inverse normalization coefficient corresponding to the normalization information, to generate a frequency spectrum;

a second inverse quantization step of linearly inversely quantizing the differential quantized frequency spectrum by use of a second inverse quantization coefficient corresponding to the second quantization information, to generate a differential normalized frequency spectrum;

a second inverse normalization step of inversely normalizing the differential normalized frequency spectrum by use of a second inverse normalization coefficient corresponding to the normalization information and the first quantization information, to generate a differential frequency spectrum;

an addition step of adding the frequency spectrum and the differential frequency spectrum; and a frequency-time transform step of performing frequency-time transform on a frequency spectrum obtained by the addition step, to generate an output audio signal.

* * * * *